United States Patent
Crounse et al.

(10) Patent No.: US 12,451,049 B2
(45) Date of Patent: Oct. 21, 2025

(54) METHODS FOR DRIVING ELECTRO-OPTIC DISPLAYS

(71) Applicant: E INK CORPORATION, Billerica, MA (US)

(72) Inventors: Kenneth R. Crounse, Somerville, MA (US); Amit Deliwala, Andover, MA (US); Stephen J. Telfer, Arlington, MA (US); Jonathan L. Zalesky, Newton, MA (US); Yin Al, San Francisco, CA (US); Teck Ping Sim, Acton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/614,645

(22) Filed: Mar. 23, 2024

(65) Prior Publication Data
US 2024/0321177 A1 Sep. 26, 2024

Related U.S. Application Data

(60) Provisional application No. 63/492,217, filed on Mar. 24, 2023.

(51) Int. Cl.
*G09G 3/296* (2013.01)

(52) U.S. Cl.
CPC ..... *G09G 3/296* (2013.01); *G09G 2320/0247* (2013.01); *G09G 2340/16* (2013.01); *G09G 2354/00* (2013.01)

(58) Field of Classification Search
None
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson |

(Continued)

FOREIGN PATENT DOCUMENTS

| | | | |
|---|---|---|---|
| TW | 201729176 A | 2/2016 | |
| WO | WO-2005054933 A2 * | 6/2005 | ............. G02F 1/167 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

(Continued)

*Primary Examiner* — Brian M Butcher
(74) *Attorney, Agent, or Firm* — Jason P. Colangelo

(57) ABSTRACT

Methods for driving an electro-optic displays having a plurality of display pixels are described. The method includes determining a level of stress quantity for a display pixel of the electro-optic display based on at least one prior update to the optical state of the display pixel, and receiving a request to update the optical state of the display pixel. The method also includes applying driving waveforms from first or second update schemes to the display pixel depending on the update scheme used for an immediately prior update of the display pixel and comparisons of the level of stress quantity to two level of stress thresholds.

20 Claims, 15 Drawing Sheets

(56) References Cited

U.S. PATENT DOCUMENTS

| | | |
|---|---|---|
| 6,054,071 A | 4/2000 | Mikkelsen, Jr. |
| 6,055,091 A | 4/2000 | Sheridon |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert et al. |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,301,038 B1 | 10/2001 | Fitzmaurice |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,870,657 B1 | 3/2005 | Fitzmaurice |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,176,880 B2 | 2/2007 | Amundson et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,952,557 B2 | 5/2011 | Amundson |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,384,658 B2 | 2/2013 | Albert et al. |
| 8,558,783 B2 | 10/2013 | Wilcox et al. |
| 8,558,785 B2 | 10/2013 | Zehner et al. |
| 8,928,562 B2 | 1/2015 | Gates et al. |
| 9,230,492 B2 | 1/2016 | Harrington et al. |
| 9,412,314 B2 | 8/2016 | Amundson et al. |
| 9,460,667 B2 | 10/2016 | Bozarth et al. |
| 9,547,392 B2 | 1/2017 | Yoon et al. |
| 9,672,766 B2 | 6/2017 | Sjodin |
| 9,985,469 B2 | 5/2018 | Jo |
| 10,163,406 B2 | 12/2018 | Sim et al. |
| 10,319,313 B2 | 6/2019 | Harris et al. |
| 10,475,396 B2 | 11/2019 | Sim et al. |
| 10,672,350 B2 | 6/2020 | Amundson et al. |
| 11,145,261 B2 | 10/2021 | Amundson et al. |
| 11,462,183 B2 | 10/2022 | Amundson et al. |
| 11,657,773 B2 | 5/2023 | Amundson et al. |
| 11,935,495 B2 | 3/2024 | Chen et al. |
| 2003/0102858 A1 | 6/2003 | Jacobson et al. |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2009/0174651 A1 | 7/2009 | Jacobson et al. |
| 2009/0322721 A1 | 12/2009 | Zehner et al. |
| 2010/0220121 A1 | 9/2010 | Zehner et al. |
| 2010/0265561 A1 | 10/2010 | Gates et al. |

OTHER PUBLICATIONS

Wood, D., "An Electrochromic Renaissance?" Information Display, 18(3), (Mar. 24, 2002).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Ota, I. et al., "Developments in Electrophoretic Displays", Proceedings of the SID, 18, 243 (1977).

European Patent Office, "International Search Report and Written Opinion", PCT/US2024/021238, May 31, 2024.

\* cited by examiner

THE GREAT MIGRATION TO AMERICA

The tide of migration that set in toward the shores of North America during the early years of the seventeenth century was but one phase in the restless and eternal movement of mankind upon the surface of the earth. The ancient Greeks flung out their colonies in every direction, westward as far as Gaul, across the Mediterranean, and eastward into Asia Minor, perhaps to the very confines of India. The Romans, supported by their armies and their government, spread their dominion beyond the narrow lands of Italy until it stretched from the heather of Scotland to the sands of Arabia. The Teutonic tribes, from their home beyond the Elbe and the Rhine, poured into the empire of the Caesars and made the beginnings of modern Europe. Of this great sweep of races and empires the settlement of America was merely a part. And it was, moreover, only one aspect of the expansion which finally carried the peoples, the institutions, and the trade of Europe to the very ends of the earth.

In one vital point, it must be noted, American colonization differed from that of the ancients. The Greeks usually carried with them affection for the government they left behind and sacred fire from the altar of the parent city; but thousands of the immigrants who came to America disliked the state and disowned the church of the mother country. They established compacts of government for themselves and set up altars of their own. They sought not only new soil to till but also political and religious liberty for

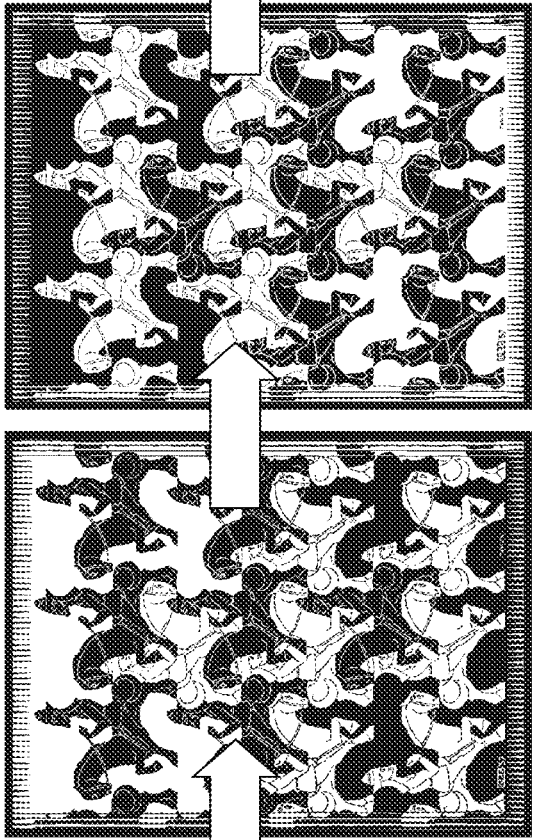

THE AGENCIES OF AMERICAN COLONIZATION

It was no light matter for the English to cross three thousand miles of water and found homes in the American wilderness at the opening of the seventeenth century. Ships, tools, and supplies called for huge outlays of money. Stores had to be furnished in quantities sufficient to sustain the life of the settlers until they could gather harvests of their own. Artisans and laborers of skill and industry had to be induced to risk the hazards of the new world. Soldiers were required for defense and mariners for the exploration of inland waters. Leaders of good judgment, adept in managing men, had to be discovered. Altogether such an enterprise demanded capital larger than the ordinary merchant or country squire could amass and involved risks more imminent than he would ordinarily assume. Though in later days, after initial tests had been made, wealthy proprietors were able to establish colonies on their own account, it was the corporation that furnished the capital and leadership in the beginning.

The Trading Company. — English pioneers in exploration found an instrument for colonization in companies of merchant adventurers, which had long been employed in carrying on commerce with foreign countries. Such a corporation was composed of many persons of different ranks of society — noblemen, merchants, and gentlemen — who banded together for a particular undertaking, each contributing a sum of money and sharing in the profits of the venture. It was organized under royal authority; it received its charter, its grant of land, and its trading privileges from the king and carried on its operations under his supervision and control. The charter named all the persons

Fig. 5

METHODS FOR DRIVING ELECTRO-OPTIC DISPLAYS

CROSS-REFERENCE TO RELATED APPLICATIONS

This application claims priority to U.S. Provisional Application 63/492,217, filed on Mar. 24, 2023, the entire contents of which are incorporated herein by reference.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 10,672,350, 11,145,261; and 11,462,183 and U.S. Patent Applications Publication Nos. 2003/0102858; 2005/0122284; 2005/0179642; 2005/0253777; 2006/0139308; 2007/0013683; 2007/0091418; 2007/0103427; 2007/0200874; 2008/0024429; 2008/0024482; 2008/0048969; 2008/0129667; 2008/0136774; 2008/0150888; 2008/0291129; 2009/0174651; 2009/0179923; 2009/0195568; 2009/0256799; 2009/0322721; 2010/0045592; 2010/0220121; 2010/0220122; 2010/0265561; 2011/0285754; and 2022/0415268.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications, or other published works, mentioned below, are herein incorporated by reference.

FIELD OF THE INVENTION

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see the aforementioned MEDEOD applications;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R_0)^{1/3} - 16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme.

Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

These drifts can also be caused by "remnant voltage," a term used to describe a persistent or decaying voltage (which also may be referred to as open-circuit electrical potential and is typically measured in volts or millivolts) that may remain in an electro-optic display after an addressing pulse (a voltage pulse used to change the optical state of the electro-optic medium) is terminated. Remnant voltages may give rise to drifts in the optical state because the optical state of a pixel may depend on the pixel's remnant voltage, and a pixel's remnant voltage may decay over time.

Secondly, such remnant voltages can lead to undesirable effects on the images displayed on electro-optic displays, including, without limitation, so-called "ghosting" phenomena, in which, after the display has been rewritten, traces of the previous image(s) are still visible. Remnant voltages may give rise to edge effects such as "edge ghosting," a type of ghosting in which an outline (edge) of a portion of a previous image remains visible.

Further, in both monochrome and color systems there is a tendency for the electric field generated by a pixel electrode to affect an area of the electro-optic medium wider than that of the pixel electrode itself so that, in effect, one pixel's optical state spreads out into parts of the areas of adjacent pixels. For example, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. In some instances, driving adjacent pixels brings about a final optical state in the area between the pixels that differs from the optical state reached by either of the adjacent pixels themselves. This final optical state in the area between the adjacent pixels is caused by an electric field experienced in the inter-pixel region that is the average of the electric fields applied to the adjacent pixels.

Similar edge effects occur when using regional updates (where only a particular region of the display is updated, for example to show an image), except that with regional updates the edge effects occur at the boundary of the region being updated. Over time, such edge effects become visually distracting and must be cleared.

Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals. The present invention relates to reducing or eliminating the problems discussed above while still avoiding so far as possible flashy updates.

It has also been found that edge ghosting can be mitigated by driving the electro-optic display with DC imbalanced waveforms. However, as discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

DC imbalanced waveforms can also produce a remnant voltage. For example, U.S. Pat. No. 7,012,600 describes how a DC imbalanced waveform can result in a remnant voltage being created, this remnant voltage being ascertainable by measuring the open-circuit electrochemical potential of a display pixel. In addition, use of DC imbalanced waveforms can result in polarization kick-back which is a change in the optical state of an electro-optic medium occurring a short period after the medium ceases to be driven. This "kick-back" or "self-erasing" is a phenomenon observed in some electro-optic displays. See, for example, Ota, I., et al., "Developments in Electrophoretic Displays", Proceedings of the SID, 18, 243 (1977), where self-erasing was reported in an unencapsulated electrophoretic display whereby, shortly after the voltage applied across the electro-optic medium is no longer applied, the electro-optic medium may at least partially reverse its optical state. For example, a pixel driven to black may revert to a dark gray in a short period of time after the pixel is deselected. In some cases, a reverse voltage which may be larger than the operating voltage can be observed to occur across the electrodes, often leading electrode damage Conventionally, post-drive-discharge ("PDD") techniques have been used for reducing or eliminating remnant voltage by draining charge from the display pixels after completion of a display update. For example, U.S. Pat. No. 10,475,396 describes PDD techniques for draining remnant voltage such as activating the display pixel's transistor and setting the voltages of the front and rear electrodes of the display pixel to approximately the same voltage for a specified period of time, and/or until the remnant voltage is reduced to less than a threshold amount. PDD techniques are especially important to use in conjunction with intentionally DC-imbalanced waveform drive schemes, which can build up remnant voltage more quickly.

However, one disadvantage of conventional PDD techniques is that such techniques require time to discharge remnant voltages after an update, and the display device becomes substantially "frozen" and unresponsive to user input during execution of a PDD routine. A typical use case for a display device can include substantially constant interactions and input from a user thereby requiring several successive updates to the display, often with DC-imbalanced waveforms that are able to perform faster updates of the display than waveforms used in standard update modes. Accordingly, locking out a display device to allow time for the remnant voltage discharge routine can result in an unsatisfactory user experience.

To reduce or eliminate periods of unresponsiveness to user interactions, conventional driving methods can be configured to interrupt execution of a PDD routine to allow subsequently-requested updates to be performed. However, conventional driving methods operate under the assumption that use cases requiring interruption to the execution of a PDD routine or having short dwell times between display updates are infrequent, and that an interrupted PDD routine will shortly thereafter be followed by a fully-executed PDD routine to discharge the display. Given the typical display device use case described above, the PDD routine may be interrupted several times before a fully-executed PDD routine is able to discharge the display sufficiently. Accordingly, this can allow a build-up of remnant charges sufficient to cause display degradation or display artifacts (e.g. ghosting) which also negatively impact user experience. The present invention also relates to reducing or eliminating the problems with remnant charge build-up discussed above while still avoiding so far as possible long periods of device unresponsiveness that can result in an unsatisfactory user experience.

SUMMARY OF THE INVENTION

Accordingly, in one aspect, this invention provides a (first) method of driving an electro-optic display having a plurality of pixels using a first drive scheme, in which all pixels are driven at each transition, and a second drive scheme, in which pixels undergoing some transitions are not driven. In the first method of the present invention, the first drive scheme is applied to a non-zero minor proportion of the pixels during a first update of the display, while the second drive scheme is applied to the remaining pixels during the first update. During a second update following the first update, the first drive scheme is applied to a different non-zero minor proportion of the pixels, while the second drive scheme is applied to the remaining pixels during the second update.

This first driving method of the present invention may hereinafter for convenience be referred to as the "selective general update" or "SGU" method of the invention.

This invention provides a (second) method of driving an electro-optic display having a plurality of pixels each of which can be driven using either a first or a second drive scheme. When a global complete update is required, the pixels are divided into two (or more) groups, and a different drive scheme is used for each group, the drive schemes differing from each other such that, for at least one transition, pixels in differing groups with the same transition between optical states will not experience the same waveform. This second driving method of the present invention may hereinafter for convenience be referred to as the "global complete multiple drive scheme" or "GCMDS" method of the invention.

The SGU and GCMDS methods discussed above reduce the perceived flashiness of image updates. However, the present invention also provides multiple methods for reducing or eliminating edge artifacts when driving bistable electro-optic displays. One such edge artifact reduction method, hereinafter referred to as the third method of the present invention requires the application of one or more balanced pulse pairs (a balanced pulse pair or "BPP" being a pair of drive pulses of opposing polarities such that the net impulse of the balanced pulse pair is substantially zero) during white-to-white transitions in pixels which can be identified as likely to give rise to edge artifacts, and are in a spatio-temporal configuration such that the balanced pulse pair(s) will be efficacious in erasing or reducing the edge artifact. Desirably, the pixels to which the BPP is applied are selected such that the BPP is masked by other update activity. Note that application of one or more BPP's does not affect the desirable DC balance of a drive scheme since each BPP inherently has zero net impulse and thus does not alter the DC balance of a drive scheme. This third driving method of the present invention may hereinafter for convenience be referred to as the "balanced pulse pair white/white transition drive scheme" or "BPPWWTDS" method of the invention.

In a related fourth method of the present invention for reducing or eliminating edge artifacts, a "top-off" pulse is applied during white-to-white transitions in pixels which can be identified as likely to give rise to edge artifacts, and are in a spatio-temporal configuration such that the top-off pulse will be efficacious in erasing or reducing the edge artifact. This fourth driving method of the present invention may hereinafter for convenience be referred to as the "white/white top-off pulse drive scheme" or "WWTOPDS" method of the invention.

A fifth method of the present invention also seeks to reduce or eliminate edge artifacts. This fifth method seeks to eliminate such artifacts which occur along a straight edge between what would be, in the absence of a special adjustment, driven and undriven pixels. In the fifth method, a two-stage drive scheme is used such that, in the first stage, a number of "extra" pixels lying on the "undriven" side of the straight edge are in fact driven to the same color as the pixels on the "driven" side of the edge. In the second stage, both the pixels on the driven side of the edge, and the extra pixels on undriven side of the edge are driven to their final optical states. Thus, this invention provides a method of driving an electro-optic display having a plurality of pixels, wherein, when a plurality of pixels lying in a first area of the display are driven so as to change their optical state, and a plurality of pixels lying in a second area of the display are not required to change their optical state, the first and second areas being contiguous along a straight line, a two-stage drive scheme is used wherein, in the first stage, a number of pixels lying within the second area and adjacent said straight line in fact driven to the same color as the pixels in the first area adjacent the straight line, while in the second stage, both the pixels in the first area, and said number of pixels in the second area are driven to their final optical states. It has been found that driving a limited number of extra pixels in this manner greatly reduces the visibility of edge artifacts, since any edge artifacts occurring along the serpentine edge defined by the extra pixels are much less conspicuous than would be corresponding edge artifacts along the original straight edge. This fifth driving method of the present invention may hereinafter for convenience be referred to as the "straight edge extra pixels drive scheme" or "SEEPDS" method of the invention.

A sixth method of the present invention allows pixels to deviate temporarily from DC balance. Many situations occur where it would be beneficial to temporarily allow a pixel to deviate from DC balance. For example, one pixel might require a special pulse towards white because it is predicted to contain a dark artifact, or, fast display switching might be required such that the full impulse needed for balance cannot be applied. A transition might interrupted because of an unpredicted event. In such situations, it is necessary, or at least desirable, to have a method which allows for and rectifies impulse deviations, especially on short time scales.

In the sixth method of the present invention, the display maintains an "impulse bank register" containing one value for each pixel of the display. When it is necessary for a pixel to deviate from a normal DC balanced drive scheme, the impulse bank register for the relevant pixel is adjusted to denote the deviation. When the register value for any pixel is non-zero (i.e., when the pixel has departed from the normal DC balanced drive scheme) at least one subsequent transition of the pixel is conducted using a waveform which differs from the corresponding waveform of the normal DC balanced drive scheme and which reduces the absolute value of the register value. The absolute value of the register value for any pixel is not allowed to exceed a predetermined amount. This sixth driving method of the present invention may hereinafter for convenience be referred to as the "impulse bank drive scheme" or "IBDS" method of the invention.

In the seventh method of the present invention, a state-machine algorithm monitors display updates that are more prone to cause the build-up of remnant voltage and the dwell times between the updates. The algorithm computes a numeric quantity indicative of the level of stress experienced by the display based on the number of DC-imbalanced updates that are not followed by sufficient dwell time to discharge remnant voltage via natural decay or to fully execute a PDD routine. When the computed quantity increases to a first threshold indicative of the limit of the display device's tolerable level of stress, the algorithm overrides the next requested DC-imbalanced update and instead uses an update mode that is less stressful to the display. For example, the algorithm may override the requested DC-imbalanced update with a DC-balanced update scheme and/or a scheme for which display updates are longer in duration and reduce the accumulated remnant charge. This seventh driving method of the present invention may hereinafter for convenience be referred to as the "mode update request override drive scheme" or "MURODS" method of the invention.

The seventh method of the present invention is a method for driving an electro-optic display having a plurality of display pixels. The method includes determining a level of stress quantity for a display pixel of the electro-optic display based on at least one prior update to the optical state of the display pixel. The method also includes receiving a request to update the optical state of the display pixel. The method also includes applying driving waveforms from a first update scheme to the display pixel when (i) driving waveforms from the first update scheme were used for an immediately prior update of the display pixel, and the level of stress quantity is not greater than a first level of stress threshold, or (ii) driving waveforms from a second update scheme were used for the immediately prior update of the display pixel, and the level of stress quantity is less than a second level of stress threshold. The method also includes applying driving waveforms from the second update scheme to the display pixel when (i) driving waveforms from the first update scheme were used for the immediately prior update of the display pixel, and the level of stress quantity is greater than the first level of stress threshold, or (ii) driving waveforms from the second update scheme were used for the immediately prior update of the display pixel, and the level of stress quantity is not less than the second level of stress threshold.

In some embodiments, the request to update the optical state of the display pixel of the electro-optic display is triggered by a user interaction with the electro-optic display. In some embodiments, the user interaction comprises swiping a surface of a screen of the electro-optic display. In some embodiments, the user interaction includes presenting an animation on the electro-optic display.

In some embodiments, the first update scheme includes driving waveforms that are DC-imbalanced. In some embodiments, the second update scheme includes driving waveforms that are DC-balanced.

In some embodiments, the second update scheme comprises driving waveforms that are longer in duration than the driving waveforms of the first update scheme. In some embodiments, the driving waveforms of the second update scheme are between approximately 350 ms and 500 ms longer in duration than the driving waveforms of the first update scheme. In some embodiments, the driving waveforms of the second update scheme are between approximately 30% and 55% longer in duration than the driving waveforms of the first update scheme. In some embodiments, the driving waveforms of the second update scheme are between approximately 50% and 70% longer in duration than the driving waveforms of the first update scheme.

In some embodiments, the level of stress quantity is a numeric quantity including an approximation of an actual amount of remnant voltage that has accumulated on the display pixel. In some embodiments, the level of stress quantity is a scalar quantity including an index indicating a growth or decay in an amount of remnant voltage that has accumulated on the display pixel.

In some embodiments, determining the level of stress quantity for the display pixel comprises computing the equation:

$$x(n) = e^{-\frac{UT(n)+DT(n)}{TAU}} * x(n-1) + e^{-\frac{DT(n)}{TAU}} * B,$$

where x(n) denotes the level of stress quantity for an update n, UT(n) denotes a duration in milliseconds of driving waveforms used for the immediately prior update of the display pixel, DT(n) denotes how many milliseconds of a post drive discharge routine were applied after the immediately prior update of the display pixel, TAU represents a time constant of a decay of the level of stress quantity x(n), x(n−1) is a level of stress quantity calculated based on the immediately prior update of the display pixel, and B has a numeric value that changes depending on the driving mode that was used for update n.

In some embodiments, B is set to a non-zero positive value after applying driving waveforms from the first update scheme to the display pixel. In some embodiments, the value of B is set to zero after applying driving waveforms from the second update scheme to the display pixel.

In some embodiments, the method further includes interrupting a post drive discharge routine after applying driving waveforms from the first update scheme. In some embodiments, the method further includes performing substantially no dwell time after applying driving waveforms from the first update scheme.

In some embodiments, the method further includes interrupting a post drive discharge routine after applying driving waveforms from the second update scheme. In some embodiments, the method further includes performing substantially no dwell time after applying driving waveforms from the second update scheme.

In some embodiments, the first level of stress threshold indicates a limit of the electro-optic display's tolerable level of stress.

The present invention also provides novel display controllers arranged to carry out the methods of the present invention. In one such novel display controller, in which a standard image, or one of a selection of standard images, are flashed on to the display at an intermediate stage of a transition from a first arbitrary image to a second arbitrary image. To display such a standard image, it is necessary to vary the waveform used for the transition from the first to the second image for any given pixel depending upon the state of that pixel in the displayed standard image. For example, if the standard image is monochrome, two possible waveforms will be required for each transition between specific gray levels in the first and second images depending upon whether a specific pixel is black or white in the standard image. On the other hand, if the standard image has sixteen gray levels, sixteen possible waveforms will be required for each transition. This type of controller may hereinafter for convenience be referred to as the "intermediate standard image" or "ISI" controller of the invention.

Furthermore, in some of the methods of the present invention (for example, the SEEDPS method), it is necessary or desirable to use a controller capable of updating arbitrary regions of the display, and the present invention provides such a controller, which may hereinafter for convenience be referred to as an "arbitrary region assignment" or "ARA" controller of the invention.

In all the methods of the present invention, the display may make use of any of the type of electro-optic media discussed above. Thus, for example, the electro-optic display may comprise a rotating bichromal member or electrochromic material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

BRIEF DESCRIPTION OF THE DRAWINGS

FIGS. 2, 3, 4 and 5 illustrate schematically GCMDS method of the present invention which proceed via intermediate images.

DETAILED DESCRIPTION OF THE INVENTION

Figure 1A:
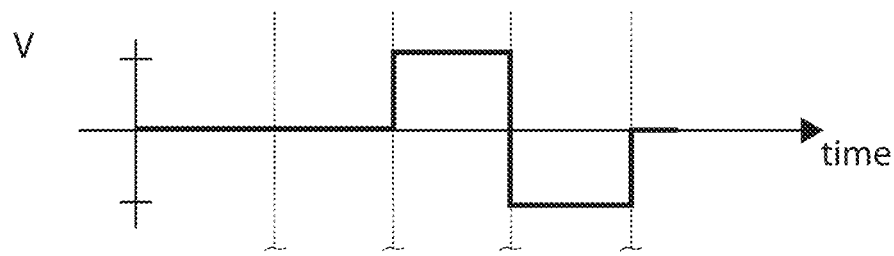
FIGS. 1A and 1B of the accompanying drawings show voltage against time curves for two balanced pair waveforms which may be used in the GCMDS method of the present invention.

It will be apparent from the foregoing that the present invention provides a plurality of discrete inventions relating to driving electro-optic displays and apparatus for use in such methods. These various inventions will be described separately below, but it will be appreciated that a single display may incorporate more than one of these inventions. For example, it will readily be apparent that a single display could make use of the selective general update and straight edge extra pixels drive scheme methods of the present invention and use the arbitrary region assignment controller of the invention.

Part a: Selective General Update Method of the Invention

As explained above, the selective general update (SGU) method of the invention is intended for use in an electro-optic display having a plurality of pixels. The method makes use of a first drive scheme, in which all pixels are driven at each transition, and a second drive scheme, in which pixels undergoing some transitions are not driven. In the SGU method, the first drive scheme is applied to a non-zero minor proportion of the pixels during a first update of the display, while the second drive scheme is applied to the remaining pixels during the first update. During a second update following the first update, the first drive scheme is applied to a different non-zero minor proportion of the pixels, while the second drive scheme is applied to the remaining pixels during the second update.

In a preferred form of the SGU method, the first drive scheme is a GC drive scheme and the second drive scheme is a GL drive scheme. In this case, the SGU method essentially replaces the prior art method, in which most updates are carried out using the (relatively non-flashy) GL drive scheme and an occasional update is carried out using the (relatively flashy) GC drive scheme, with a method in which a minor proportion of pixels use the GC drive scheme at each update, with the major proportion of pixels using the GL drive scheme. By careful choice of the distribution of the pixels using the GC drive scheme, each update using the SGU method of the present invention can be achieved in a manner which (to the non-expert user) is not perceived as significantly more flashy than a pure GL update, while the infrequent, flashy and distracting pure GC updates are avoided.

For example, suppose a specific display is found to require use of a GC drive scheme for one update of every four. To implement the SGU method of the invention, the display can be divided into 2×2 groups of pixels. During the first update, one pixel in each group (say the upper left pixel) is driven using the GC drive scheme, while the three remaining pixels are driven using the GL drive scheme. During the second update, a different pixel in each group (say the upper right pixel) is driven using the GC drive scheme, while the three remaining pixels are driven using the GL drive scheme. The pixel which is driven using the GC drive scheme rotates with each update. In theory, each update is one-fourth as flashy as a pure GC update, but the increase in flashiness is not particularly noticeable, and the distracting pure GC update at each fourth update in the prior art method is avoided.

The decision as to which pixel receives the GC drive scheme in each update may be decided systematically, using some tessellating pattern, as in the 2×2 grouping arrangement discussed above, or statistically, with an appropriate proportion of pixels being selected randomly at each update; for example, with 25 percent of the pixels being selected at each update. It will readily be apparent to those skilled in visual psychology that certain "noise patterns" (i.e., distributions of selected pixels) may work better than others. For example, if one were to select one pixel out of each adjacent 3×3 group to use a GC drive scheme at each update, it might be advantageous not to set the corresponding pixel is each group at each update, since this would produce a regular array of "flashy" pixels, which might be more noticeable than an at least pseudo-random array of "flashy" pixels caused by choosing different pixels in each group.

At least in some cases, it may be desirable to arrange the various groups of pixels using a GC drive scheme at each update on a parallelogram or pseudo-hexagonal grid. Examples of square or rectangular "tiles" of pixels which then repeated in both directions provide such a parallelogram or pseudo-hexagonal grid are as follows (the numbers designate the update numbers at which a GC drive scheme is applied to the pixels:

|   |   |   |   |   |   |   |   |
|---|---|---|---|---|---|---|---|
|   | 1 | 2 | 5 | 4 | 6 | 3 |   |
|   | 6 | 3 | 1 | 2 | 5 | 4 |   |
|   | 5 | 4 | 6 | 3 | 1 | 2 |   |
|   |   |   | and |   |   |   |   |
| 1 | 2 | 6 | 7 | 8 | 3 | 4 | 5 |
| 3 | 4 | 5 | 1 | 2 | 6 | 7 | 8 |
| 6 | 7 | 8 | 3 | 4 | 5 | 1 | 2 |
| 5 | 1 | 2 | 6 | 7 | 8 | 3 | 4 |
| 8 | 3 | 4 | 5 | 1 | 2 | 6 | 7 |
| 2 | 6 | 7 | 8 | 3 | 4 | 5 | 1 |
| 4 | 5 | 1 | 2 | 6 | 7 | 8 | 3 |
| 7 | 8 | 3 | 4 | 5 | 1 | 2 | 6 |

More than one pattern of selected pixels could be used to account for different usage models. There could be more than one pattern used of different intensities (e.g., a 2×2 block with one pixel using a GC drive scheme, as compared with a 3×3 block with one pixel using a GC drive scheme) to lightly watermark the page during updates. This watermark could change on the fly. The patterns could be shifted relative to one another in such a way as to create other desirable watermark patterns.

The SGU method of the present invention is of course not confined to combinations of GC and GL drive schemes and may be used with other drive schemes as long as one drive scheme is less flashy than the other, while the second offers better performance. Also, a similar effect could be produced by using two or more drive schemes and varying which pixels see a partial update and which see a full update.

The SGU method of the present invention can usefully be used in combination with the BPPWWTDS or WWTOPDS methods of the present invention described in detail below. Implementing the SGU method does not require extensive development of modified drive schemes (since the method can use combinations of prior art drive schemes) but allows for a substantially reduction in the apparent flashiness of the display.

Part B: Global Complete Multiple Drive Scheme Method of the Invention

As explained above, the global complete multiple drive scheme or GCMDS method of the invention is a second method of driving an electro-optic display having a plurality of pixels each of which can be driven using either a first or a second drive scheme. When a global complete update is required, the pixels are divided into two (or more) groups, and a different drive scheme is used for each group, the drive schemes differing from each other such that, for at least one transition, pixels in differing groups with the same transition between optical states will not experience the same waveform.

Part of the reason for the flashiness of a prior art global complete (GC) update is that in such an update typically a large number of pixels are being subjected simultaneously to the same waveform. For reasons explained above, in many cases this is the white-to-white waveform, although in other cases (for example, when white text is displayed on a black background) the black-to-black waveform could be responsible for a large proportion of the flashiness. In the GCMDS method, instead of driving (and thus flashing) every pixel of the display undergoing the same transition simultaneously with the same waveform, pixels are assigned a group value such that, for at least some transitions, different waveforms are applied to pixels of different groups undergoing the same transition. Therefore, pixels undergoing identical image state transitions will not (necessarily) experience the same waveform, and will thus not flash simultaneously. Furthermore, the pixel groupings and/or waveforms used may be adjusted between image updates.

Figure 1B:
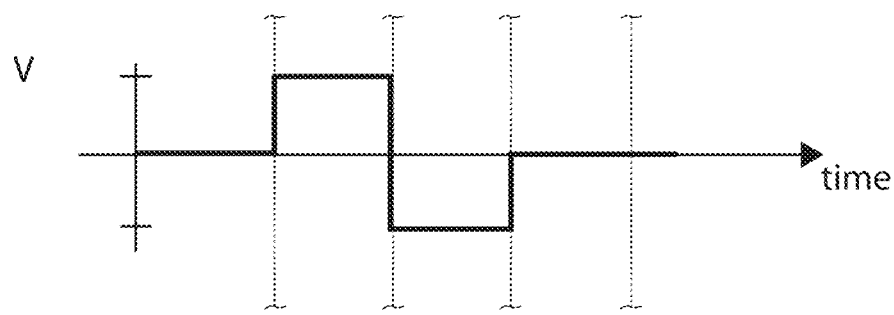
Figure 1C:
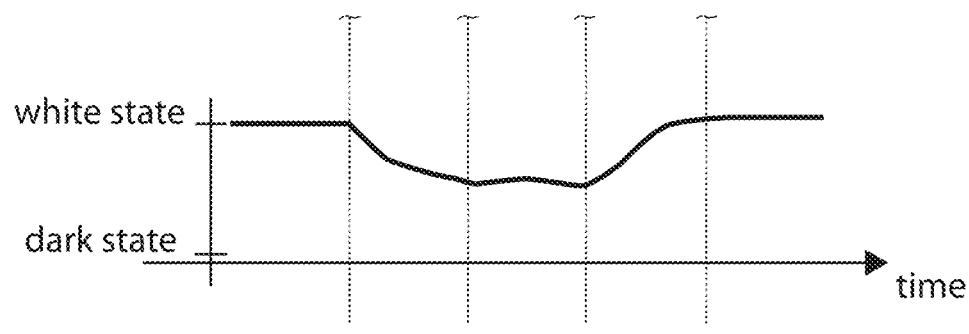
FIG. 1C shows a graph of reflectance against time for a display in which equal numbers of pixels are driven using the waveforms shown in FIGS. 1A and 1B.

Using the GCMDS method, it is possible to achieve substantial reductions in the perceived flashiness of global complete updates. For example, suppose pixels are divided on a checkerboard grid, with pixels of one parity assigned to Class A and the pixels of the other parity to Class B. Then, the white-to-white waveforms of the two classes can be chosen such that they are offset in time such that the two classes are never in a black state at the same time. One way of arranging for such waveforms is to use a conventional balanced pulse pair waveform (i.e., a waveform comprising two rectangular voltage pulses of equal impulse but opposite polarity) for both waveforms, but to delay one waveform by the duration of a single pulse. A pair of waveforms of this type is illustrated in FIGS. 1A and 1B of the accompanying drawings. FIG. 1C shows the reflectance against time for a display in which half the pixels are driven using the FIG. 1A waveform and the other half are driven using the FIG. 1B waveform. It will be seen from FIG. 1C that the reflectance of the display never approaches black, as it would, for example, if the FIG. 1A waveform alone were used.

Other waveform pairs (or larger multiplets—more than two classes of pixels may be used) can provide similar benefits. For example, for a mid-gray to mid-gray transition, two "single rail bounce" waveforms could be used, one of which would drive from the mid-gray level to white and back to mid-gray, while the other would drive from the mid-gray level to black and then back to mid-gray. Also, other spatial arrangements of pixel classes are possible, such as horizontal or vertical stripes, or random white noise.

Figure 2:
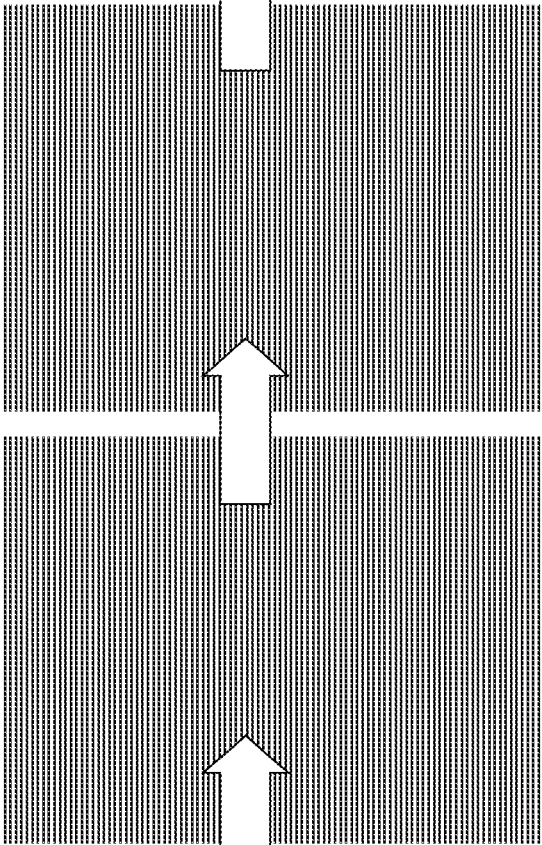
Figure 3:
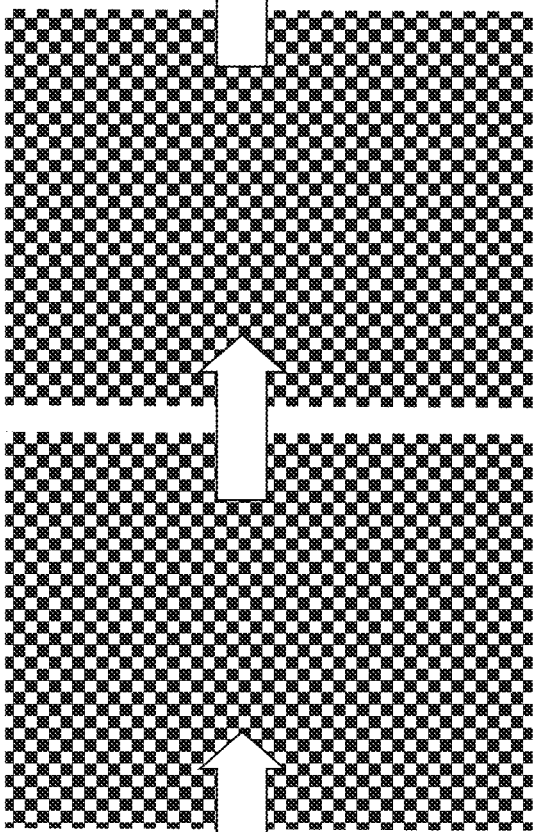
Figure 4:
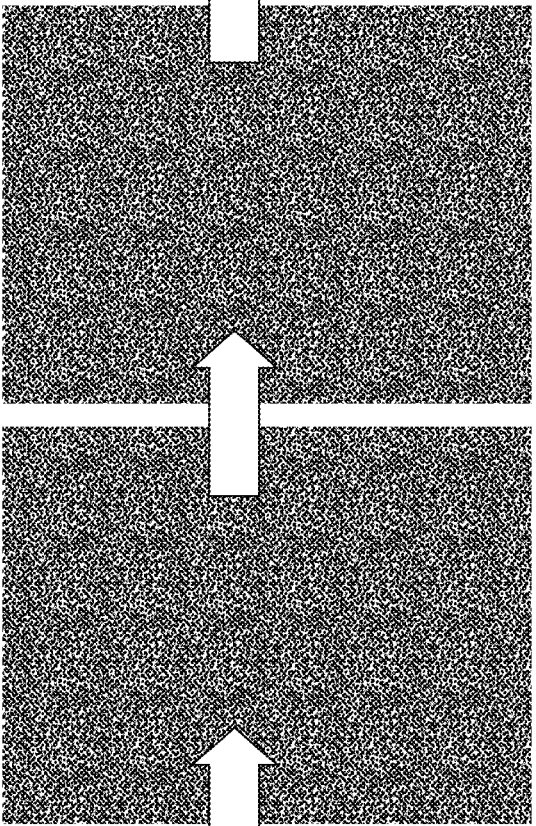

In a second form of the GCMDS method, the division of the pixels into classes is arranged so that one or more transitory monochrome images are displayed during the update. This reduces the apparent flashiness of the display by drawing the user's attention to the intermediate image(s) rather than to any flashing occurring during the update, in rather the same manner that a magician directs an audience's attention away from an elephant entering from stage right. Examples of intermediate images which may be employed include monochrome checkerboards, company logos, stripes, a clock, a page number or an Escher print. For example, FIG. 2 of the accompanying drawings illustrates a GCMDS method in which two transitory horizontally striped images are displayed during the transition, FIG. 3 illustrates a GCMDS method in which two transitory checkerboard images are displayed during the transition, FIG. 4 illustrates a GCMDS method in which two transitory random noise patterns are displayed during the transition, and FIG. 5 illustrates a GCMDS method in which two transitory Escher images are displayed during the transition.

The two ideas discussed above (the use of multiple waveforms and the use of transitory intermediate images may be used simultaneously both to reduce the flashiness of the transition and to distract the user by drawing attention to an interesting image.

It will be appreciated that implementation of the GCMDS method will typically require a controller which can maintain a map of pixel classes; such a map may be hard wired into the controller or loaded via software, the latter having the advantage that pixel maps could be changed at will. To derive the waveform needed for each transition, the controller will take the pixel class of the relevant pixel from the map and use it as an additional pointer into the lookup table which defines the various possible waveforms; see the aforementioned MEDEOD applications, especially U.S. Pat. No. 7,012,600. Alternatively, if the waveforms for various pixel classes are simply delayed versions of a single basic waveform, a simpler structure could be used; for example, a single waveform lookup table could be referenced for updating two separate classes of pixels, where the two pixel classes begin updating with a time shift, which might be equal to a multiple of a basic drive pulse length. It will be appreciated that in some divisions of pixels into classes, a map may be unnecessary since the class of any pixel may be calculated simply from its row and column number. For example, in the striped pattern flash shown in FIG. 2, a pixel can be assigned to its class on the basis of whether its row number is even or odd, while in the checkerboard pattern shown in FIG. 3, a pixel can be assigned to its class on the basis of whether the sum of its row and column numbers is odd or even.

The GCMDS method of the present invention provides a relatively simple mechanism to reduce the visual impact of flashing during updating of bistable displays. Use of a GCMDS method with a time-delayed waveform for various pixel classes greatly simplifies the implementation of the GCMDS method at some cost in overall update time.

Part C: Balanced Pulse Pair White/White Transition Drive Scheme Method of the Invention As explained above, the balanced pulse pair white/white transition drive scheme (BPPWWTDS) of the present invention is intended to reduce or eliminate edge artifacts when driving bistable electro-optic displays. The BPPWWTDS requires the application of one or more balanced pulse pairs (a balanced pulse pair or "BPP" being a pair of drive pulses of opposing polarities such that the net impulse of the balanced pulse pair is substantially zero) during white-to-white transitions in pixels which can be identified as likely to give rise to edge artifacts, and are in a spatio-temporal configuration such that the balanced pulse pair(s) will be efficacious in erasing or reducing the edge artifact.

The BPPWWTDS attempts to reduce the visibility of accumulated errors in a manner which does not have a distracting appearance during the transition and in a manner that has bounded DC imbalance. This is effected by applying one or more balanced pulse pairs to a subset of pixels of the display, the proportion of pixels in the subset being small enough that the application of the balanced pulse pairs is not visually distracting. The visual distraction caused by the application of the BPP's may be reduced by selecting the pixels to which the BPP's are applied adjacent to other pixels undergoing readily visible transitions. For example, in one form of the BPPWWTDS, BPP's are applied to any pixel undergoing a white-to-white transition and which has at least one of its eight neighbors undergoing a (not white)-to-white transition. The (not white)-to-white transition is likely to induce a visible edge between the pixel to which it is applied and the adjacent pixel undergoing the white-to-white transition, and this visible edge can be reduced or eliminated by the application of the BPP's. This scheme for selecting the pixels to which BPP's are to be applied has the advantage of being simple, but other, especially more conservative, pixel selection schemes may be used. A conservative scheme (i.e., one which ensures that only a small proportion of pixels have BPP's applied during any one transition) is desirable because such a scheme has the least impact on the overall appearance of the transition.

As already indicated, the BPP's used in the BPPWWTDS of the present invention can comprise one or more balanced pulse pairs. Each half of a balanced pulse pair may consist of single or multiple drive pulses, provided only that each of the pair has the same amount. The voltages of the BPP's may vary provided only that the two halves of a BPP must have the same amplitude but opposite sign. Periods of zero voltage may occur between the two halves of a BPP or between successive BPP's. For example, in one experiment, the results of which are described below, the balanced BPP's comprises a series of six pulses, +15V, −15V, +15V, −15V, +15V, −15V, with each pulse lasting 11.8 milliseconds. It has been found empirically that the longer the train of BPP's, the greater the edge erasing which is obtained. When the BPP's are applied to pixels adjacent to pixels undergoing (non-white)-to-white transitions, it has also been found that shifting the BPP's in time relative to the (non-white)-to-white waveform also affects the degree of edge reduction obtained. There is at present no complete theoretical explanation for these findings.

Figure 6A:
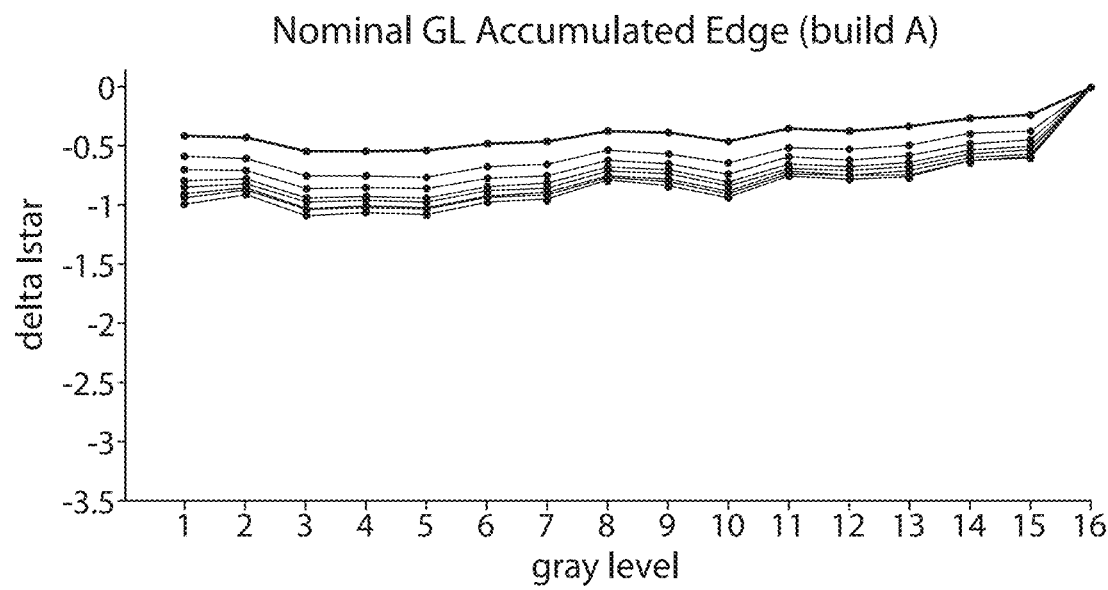
FIGS. 6A and 6B illustrate respectively the differences in L* values of the various gray levels achieved using a BPPWWTDS of the present invention and a prior art Global Limited drive scheme.
Figure 6B:
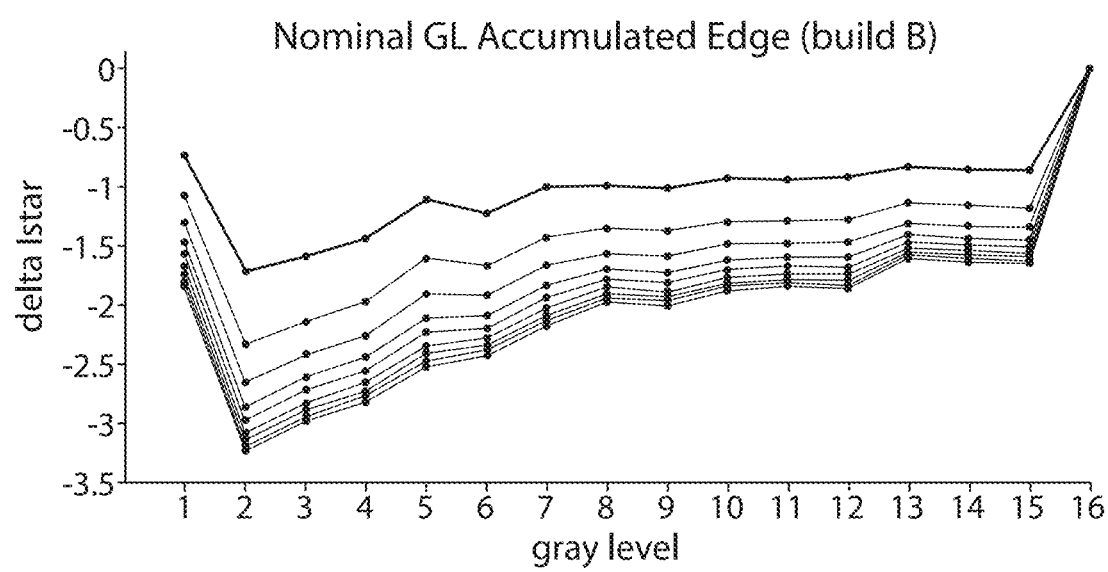

It was found in the experiment referred to in the preceding paragraph that the BPPWWTDS was effective in reducing the visibility of accumulated edges as compared with the prior art Global Limited (GL) drive scheme. FIG. 6 of the accompanying drawings shows the differences in L* values of the various gray levels for the two drive schemes, and it will be seen that the L* differences for the BPPWWTDS are much closer to zero (the ideal) than those for the GL drive scheme. Microscopic examination of edge regions after applications of the BPPWWTDS shows two types of responses that can account for the improvement. In some cases it appears that the actual edge is eroded by the application of the BPPWWTDS. In other cases it appears that the edge is not much eroded, but adjacent to the dark edge another light edge is formed. This edge pair cancels out when viewed from a normal user distance.

Figure 7A:
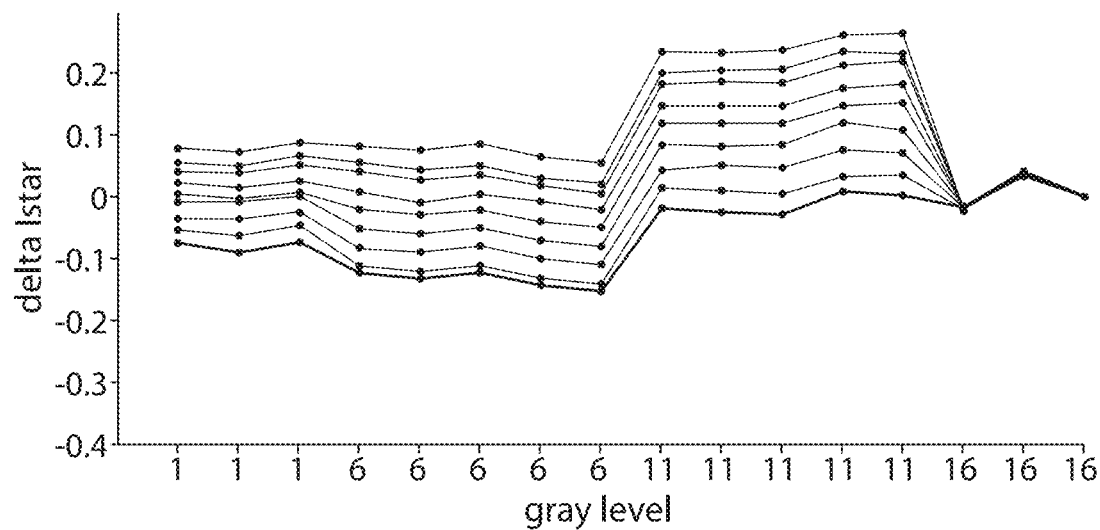
FIGS. 7A and 7B are graphs similar to those of FIGS. 6A and 6B respectively but illustrate the over-correction which may occur in certain BPPWWTDS's of the present invention.
Figure 7B:
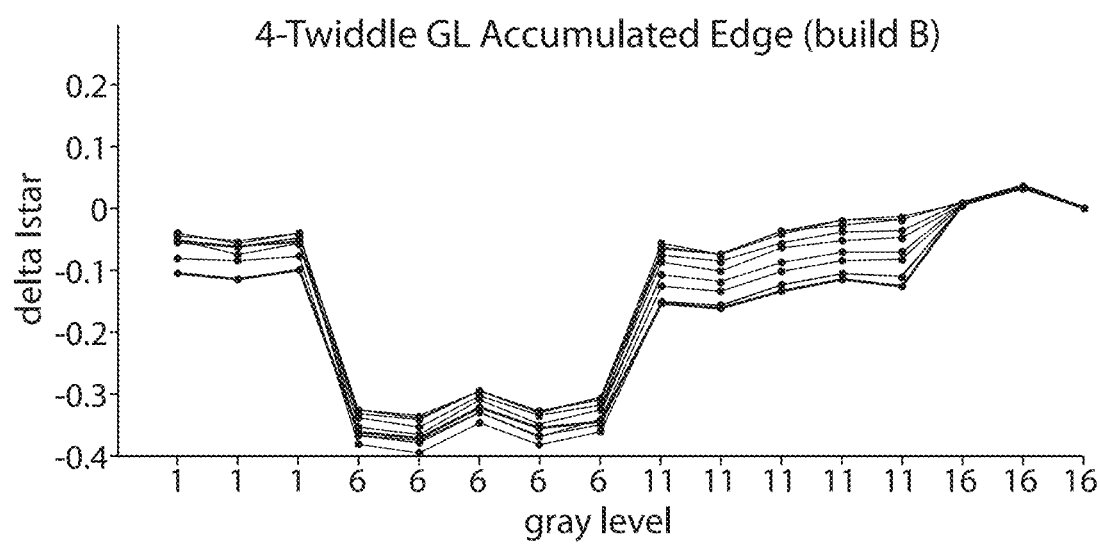
Figure 8A:
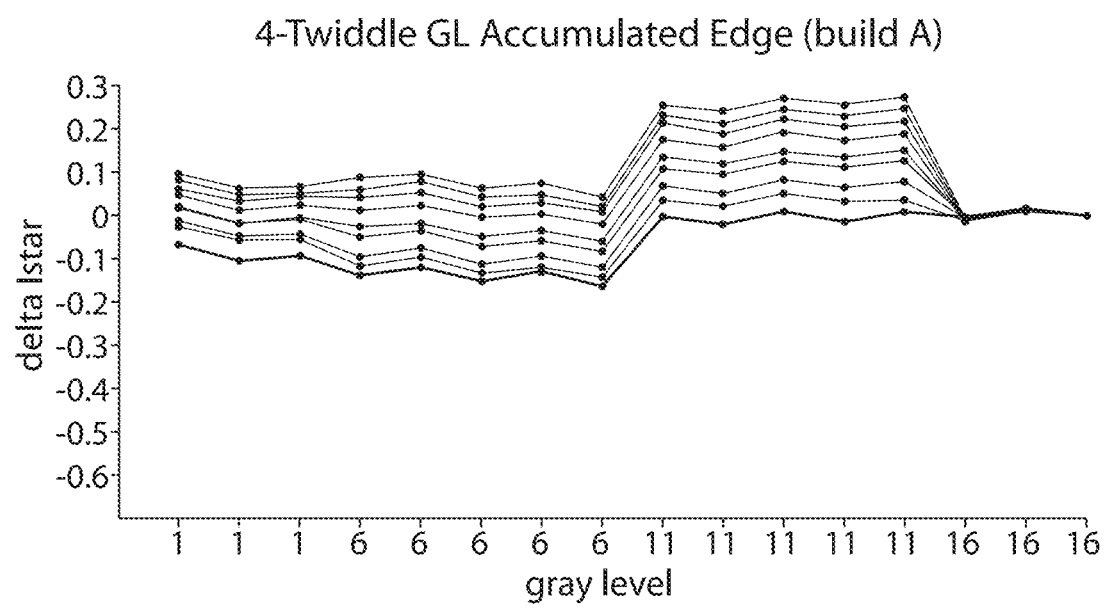
FIGS. 8A-8D are graphs similar to that of FIG. 7A but show the effects of using 1, 2, 3 and 4 respectively balanced pulse pairs in BPPWWTDS's of the present invention.
Figure 8B:
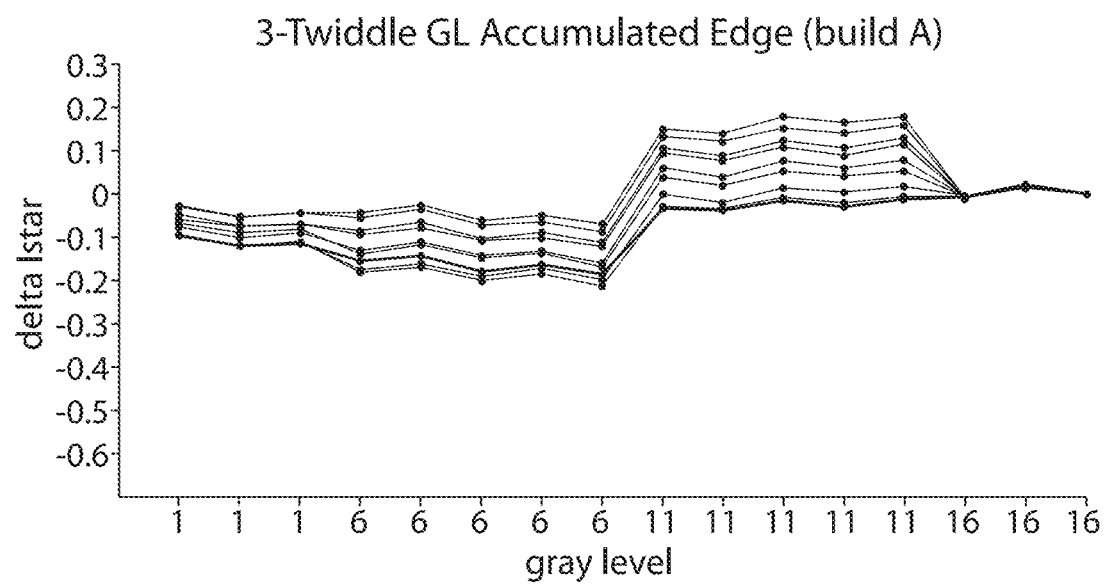
Figure 8C:
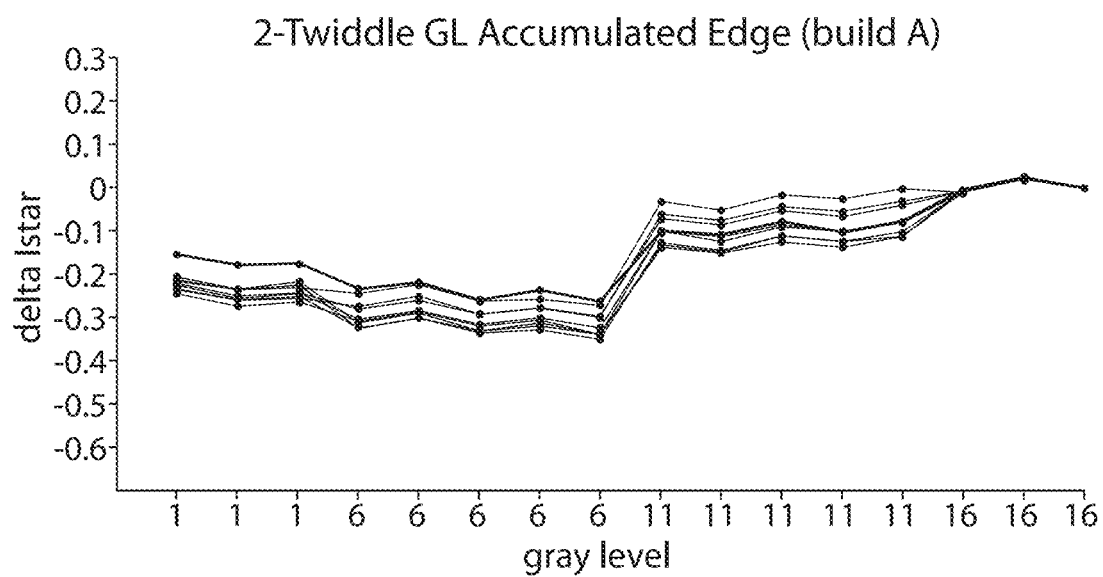
Figure 8D:
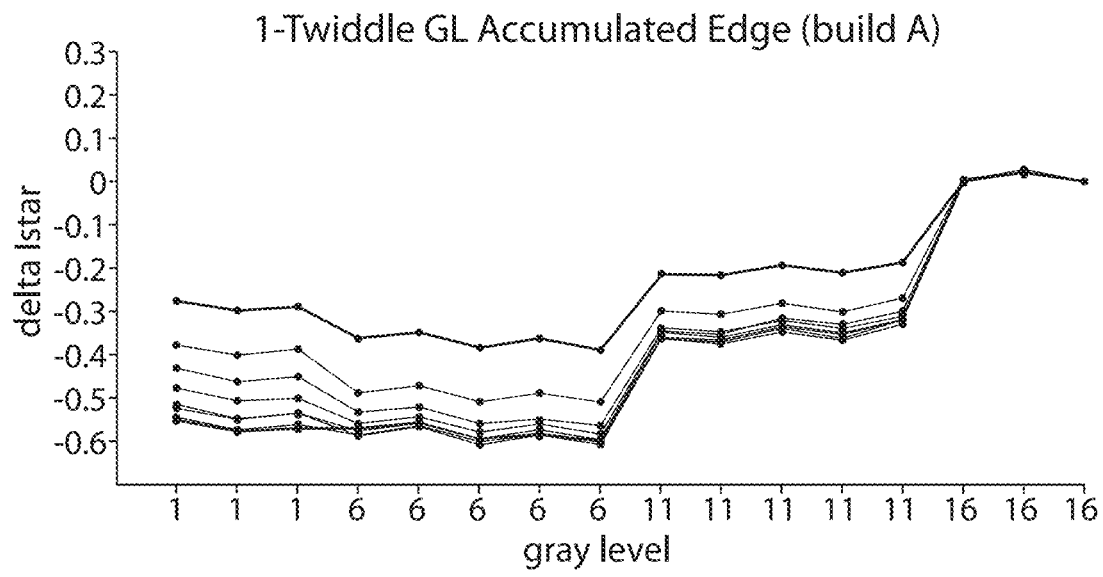

In some cases, it has been found that application of the BPPWWTDS can actually over-correct for the edge effects (indicated in plots such as those of FIG. 6 by the L* differences assuming negative values). See FIG. 7 which shows such over-correction in an experiment using a train of four BPP's. If such over-correction occurs, it has been found that it may be reduced or eliminated by reducing the number of BPP's employed or by adjusting the temporal position of the BPP's relative to the (non-white)-to-white transitions. For example, FIG. 8 shows the results of an experiment using from one to four BPP's to correct edge effects. With the particular medium being tested, it appears that two BPP's give the best edge correction. The number of BPP's and/or the temporal position of the BPP's relative to the (non-white)-to-white transitions could be adjusted in a time-varying manner (i.e., on the fly) to provide optimum correction of predicted edge visibility.

As already discussed, the drive schemes used for bistable electro-optic media should normally be DC balanced, i.e., the nominal DC imbalance of the drive scheme should be bounded. Although a BPP appears inherently DC balanced and thus should not affect the overall DC balance of a drive scheme, the abrupt reversal of voltage on the pixel capacitor which is normally present in backplanes used to drive bistable electro-optic media (see, for example, U.S. Pat. No. 7,176,880) may result in incomplete charging of the capacitor during the second half of the BPP can in practice induce some DC imbalance. A BPP applied to a pixel none of whose neighbors are undergoing a non-zero transition can lead to whitening of the pixel or other variation in optical state, and a BPP applied to a pixel having a neighboring pixel undergoing a transition other than to white can result in some darkening of the pixel. Accordingly, considerable care should be exercised in choosing the rules by which pixels receiving BPP's are selected.

In one form of the BPPWWTDS of the present invention, logical functions are applied to the initial and final images (i.e., the images before and after the transition) to determine if a specific pixel should have one or more BPP's applied during the transition. For example, various forms of the BPPWWTDS might specify that a pixel undergoing a white-to-white transition would have BPP's applied if all four cardinal neighbors (i.e., pixels which share a common edge, not simply a corner, with the pixel in question) have a final white state, and at least one cardinal neighbor has an initial non-white state. If this condition does not apply, a null transition is applied to the pixel, i.e., the pixel is not driven during the transition. Other logical selection rules can of course be used.

Another variant of the BPPWWTDS in effect combines the BPPWWTDS with the SGU drive scheme of the present invention by applying a global complete drive scheme to certain selected pixels undergoing a white-to-white transition to further increase edge clearing. As noted above in the discussion of SGU drive schemes, the GC waveform for a white-to-white transition is typically very flashy so that it is important to apply this waveform only to a minor proportion of the pixels during any one transition. For example, one might apply a logical rule that the GC white-to-white waveform is only applied to a pixel when three of its cardinal neighbors are undergoing non-zero transitions during the relevant transition; in such a case, the flashiness of the GC waveform is hidden among the activity of the three transitioning cardinal neighbors. Furthermore, if the fourth cardinal neighbor is undergoing a zero transition, the GC white-to-white waveform being applied to the relevant pixel may edge an edge in the fourth cardinal neighbor, so that it may be desirable to apply BPP's to this fourth cardinal neighbor.

Other variants of the BPPWWTDS involve application of a GC white-to-white (hereinafter "GCWW") transition to select areas of the background, i.e. areas in which both the initial and final states are white. This is done such that every pixel is visited once over a predetermined number of updates, thereby clearing the display of edge and drift artifacts over time. The main difference from the variant discussed in the preceding paragraph is that the decision as to which pixels should receive the GC update is a based on spatial position and update number, not the activity of neighboring pixels.

In one such variant, a GCWW transition is applied to a dithered sub-population of background pixels on a rotating per-update basis. As discussed in Part A above, this can reduce the effects of image drift, since all background pixels are updated after some predetermined number of updates, while only producing a mild flash, or dip, in the background white state during updates. However, the method may produce its own edge artifacts around the updated pixels which persist until the surrounding pixels are themselves updated. In accordance with the BPPWWTDS, edge-reducing BPP's may be applied to the neighbors of the pixels undergoing a GCWW transition, so that background pixels can be updated without introducing significant edge artifacts.

In a further variant, the sub-populations of pixels being driven with a GCWW waveform are further segregated into sub-sub-populations. At least some of the resultant sub-sub-populations receive a time-delayed version of the GCWW waveform such that only one part of them is in the dark state at any given time during the transition. This further diminishes the impact of the already weakened flash during the update. Time delayed versions of the BPP signal are also applied to the neighbors of these sub-sub-populations. By this means, for a fixed reduction in exposure to image drift, the apparent background flash can be reduced. The number of sub-sub-populations is limited by the increase in update time (caused by the use of delayed signals) that is deemed acceptable. Typically two sub-sub-populations would be used, which nominally increases the update time by one fundamental drive pulse width (typically about 240 ms at 25° C.). Also, having overly sparse sub-sub-populations also makes the individual updating background pixels more obvious psycho-visually which adds a different type of distraction that may not be desirable.

Modification of a display controller (such as those described in the aforementioned U.S. Pat. No. 7,012,600) to implement the various forms of the BPPWWTDS of the present invention is straightforward. One or more buffers stores gray scale data representing the initial and final image for a transition. From this data, and other information such as temperature and drive scheme, the controller selects from a lookup table the correct waveform to apply to each pixel. To implement the BPPWWTDS, a mechanism must be provided to choose among several different transitions for the same initial and final gray states (in particular the states representing white), depending on the transitions being undergone by neighboring pixels, the sub-groups to which each pixel belongs, and the number of the update (when different sub-groups of pixels are being updated in different updates. For this purpose, the controller could store additional "quasi-states" as if they were additional gray levels. For example, if the display uses 16 gray tones (numbered 0 to 15 in the lookup table), states 16, 17, and 18 could be used to represent the type of white transition that is required. These quasi-state values could be generated at various different levels in the system, e.g. at the host level, at the point of rendering to the display buffer, or at an even lower level in the controller when generating the LUT address.

Several variants of the BPPWWTDS of the present invention can be envisioned. For example, any short DC balanced, or even DC imbalanced, sequence of drive pulses could be used in place of a balanced pulse pair. A balanced pulse pair could be replaced by a top-off pulse (see Part D below), or BPP's and top-off pulses can be used in combination.

Although the BPPWWTDS of the present invention has been described above primarily in relation to white state edge reduction it may also be applicable to dark state edge reduction, which can readily be effected simply by reducing the polarity of the drive pulses used in the BPPWWTDS.

The BPPWWTDS of the present invention can provide a "flashless" drive scheme that does not require a periodic global complete update, which is considered objectionable by many users.

Part D: White/White Top-Off Pulse Drive Scheme Method of the Invention

As described above, a fourth method of the present invention for reducing or eliminating edge artifacts resembles the BPPWWTDS described above in that a "special pulse" is applied during white-to-white transitions in pixels which can be identified as likely to give rise to edge artifacts, and are in a spatio-temporal configuration such that the special pulse will be efficacious in erasing or reducing the edge artifact. However, this fourth method differs from the third in that the special pulse is not a balanced pulse pair, but rather a "top-off" or "refresh" pulse. The term "top-off" or "refresh" pulse is used herein in the same manner as in the aforementioned U.S. Pat. No. 7,193,625 to refer to a pulse applied to a pixel at or near one extreme optical state (normally white or black) which tends to drive the pixel towards that extreme optical state. In the present case, the term "top-off" or "refresh" pulse refers to the application to a white or near-white pixel of a drive pulse having a polarity which drives the pixel towards its extreme white state. This fourth driving method of the present invention may hereinafter for convenience be referred to as the "white/white top-off pulse drive scheme" or "WWTOPDS" method of the invention.

The criteria for choosing the pixels to which a top-off pulse is applied in the WWTOPDS method of the present invention are similar to those for pixel choice in the BPPWWTDS method described above. Thus, the proportion of pixels to which a top-off pulse is applied during any one transition should be small enough that the application of the top-off pulse is not visually distracting. The visual distraction caused by the application of the top-off pulse may be reduced by selecting the pixels to which the top-off pulse is applied adjacent to other pixels undergoing readily visible transitions. For example, in one form of the WWTOPDS, a top-off pulse is applied to any pixel undergoing a white-to-white transition and which has at least one of its eight neighbors undergoing a (not white)-to-white transition. The (not white)-to-white transition is likely to induce a visible edge between the pixel to which it is applied and the adjacent pixel undergoing the white-to-white transition, and this visible edge can be reduced or eliminated by the application of the top-off pulse. This scheme for selecting the pixels to which top-off pulses are to be applied has the advantage of being simple, but other, especially more conservative, pixel selection schemes may be used. A conservative scheme (i.e., one which ensures that only a small proportion of pixels have top-off pulses applied during any one transition) is desirable because such a scheme has the least impact on the overall appearance of the transition. For example, it is unlikely that a typical black-to-white waveform would induce an edge in a neighboring pixel, so that it is not necessary to apply a top-off pulse to this neighboring pixel if there is no other predicted edge accumulation at the pixel. For example, consider two neighboring pixels (designated P1 and P2) that display the sequences:

P1: W→W→B→W→W and
P2: W→B→B→B→W.

While P2 is likely to induce an edge in P1 during its white-to-black transition, this edge is subsequently erased during the P1 black-to-white transition, so that the final P2 black-to-white transition should not trigger the application of a top-off pulse in P1. Many more complicated and conservative schemes can be developed. For example, the inducement of edges could be predicted on a per-neighbor basis. Furthermore, it may be desirable to leave some small number of edges untouched if they are below some predetermined threshold. Alternatively, it might not be necessary to clean up edges unless the pixel will be in a state where it is surrounded by only white pixels, since edge effects tend not to be readily visible when they lie adjacent an edge between two pixel having very different gray levels.

It has been found empirically that, when application of a top-off pulse to one pixel is correlated with at least one of its eight neighbors undergoing a (not white)-to-white transition, the timing of the top-off pulse relative to the transition on the adjacent pixel has a substantial effect on the degree of edge reduction achieved, with the best results being obtained when the top-off pulse coincides with the end of the waveform applied to the adjacent pixel. The reasons for this empirical finding are not entirely understood at present.

Figure 9:
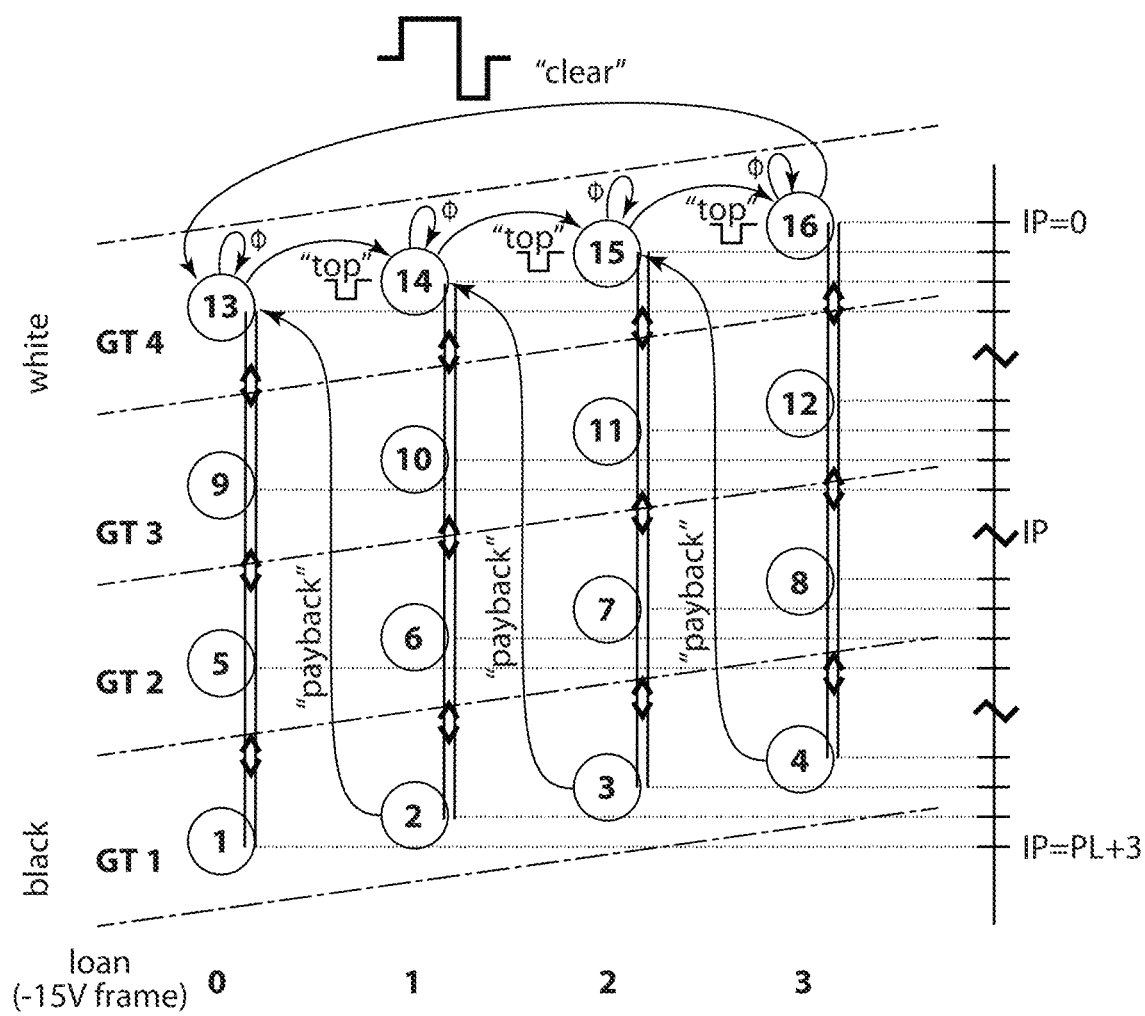
FIG. 9 shows schematically various transitions occurring in a combined WWTOPDS/IBDS of the present invention.
Figure 10A:
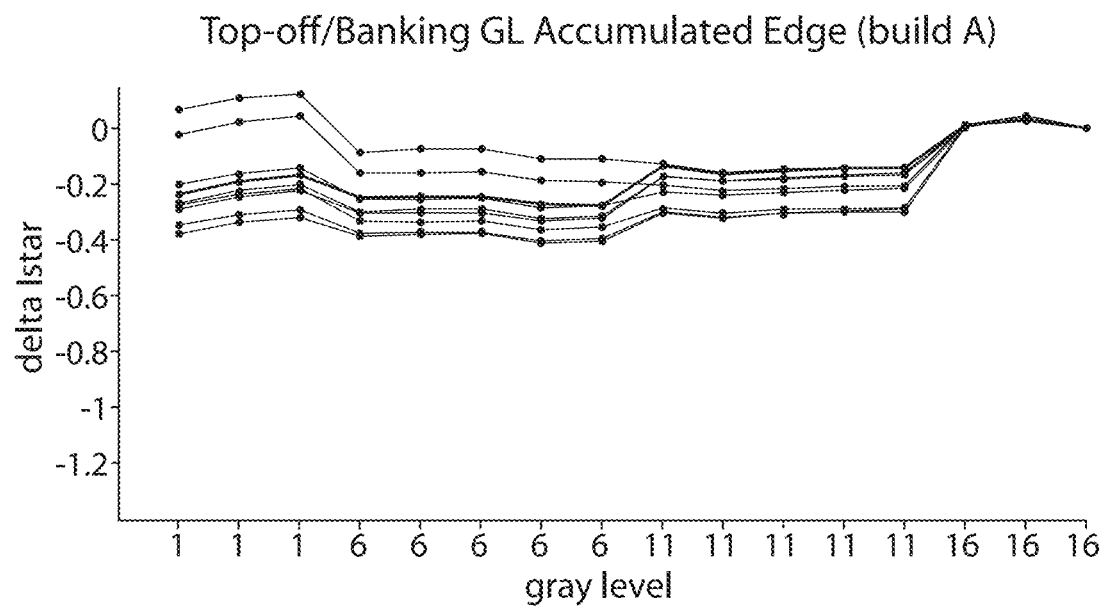
FIGS. 10A and 10B are graphs similar to those of FIGS. 6A and 6B respectively but showing the errors in gray levels achieved using the combined WWTOPDS/IBDS of the present invention illustrated in FIG. 9.
Figure 10B:
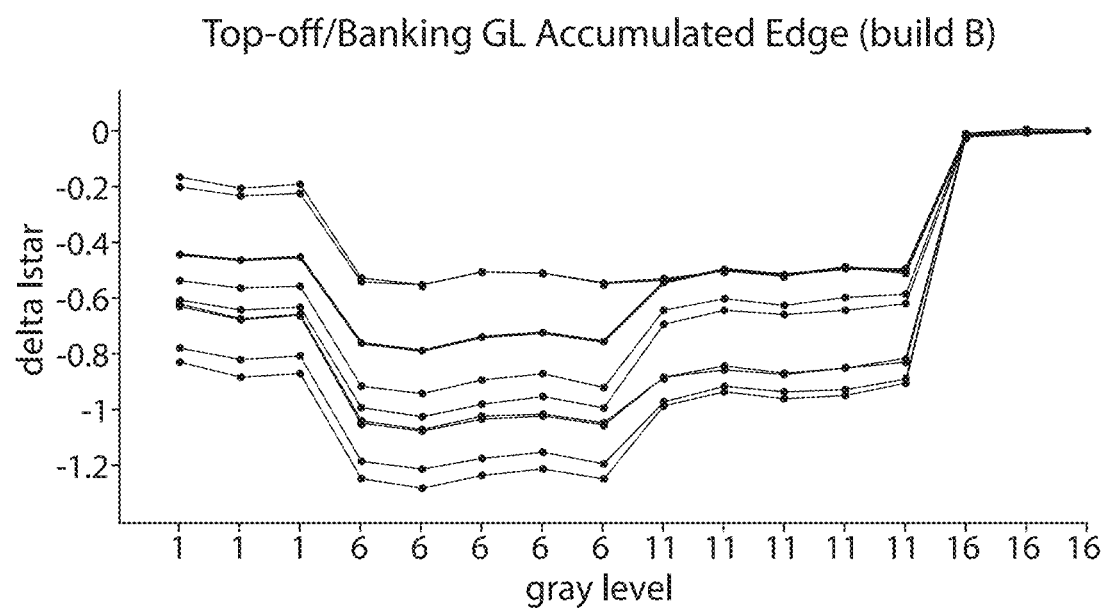

In one form of the WWTOPDS method of the present invention, the top-off pulses are applied in conjunction with an impulse banking drive scheme (as to which see Part F below). In such a combined WWTOPDS/IBDS, in addition to application of a top-off pulse, a clearing slideshow waveform (i.e., a waveform which repeatedly drives the pixel to its extreme optical states) is occasionally applied to the pixel when DC balance is to be restored. This type of drive scheme is illustrated in FIG. 9 of the accompanying drawings. Both top-off and clearing (slideshow) waveforms are applied only when pixel selection conditions are met; in all other cases, the null transition is used. Such a slideshow waveform will remove edge artifacts from the pixel, but is a visible transition. The results of one drive scheme of this type are shown in FIG. 10 of the accompanying drawings; these results may be compared with those in FIG. 6, although it should be noted that the vertical scale in different in the two set of graphs. Due to the periodic application of the clearing pulse, the sequence is not monotonic. Since application of the slideshow waveform occurs only rarely, and can be controlled so that it only occurs adjacent other visible activity, so that it is seldom noticeable. The slideshow waveform has the advantage of essentially completely cleaning a pixel, but has the disadvantage of inducing in adjacent pixels edge artifacts that require cleaning. These adjacent pixels may be flagged as likely to contain edge artifacts and thus requiring cleaning at the next available opportunity, although it will be appreciated that the resultant drive scheme can lead to a complex development of edge artifacts.

Figure 11A:
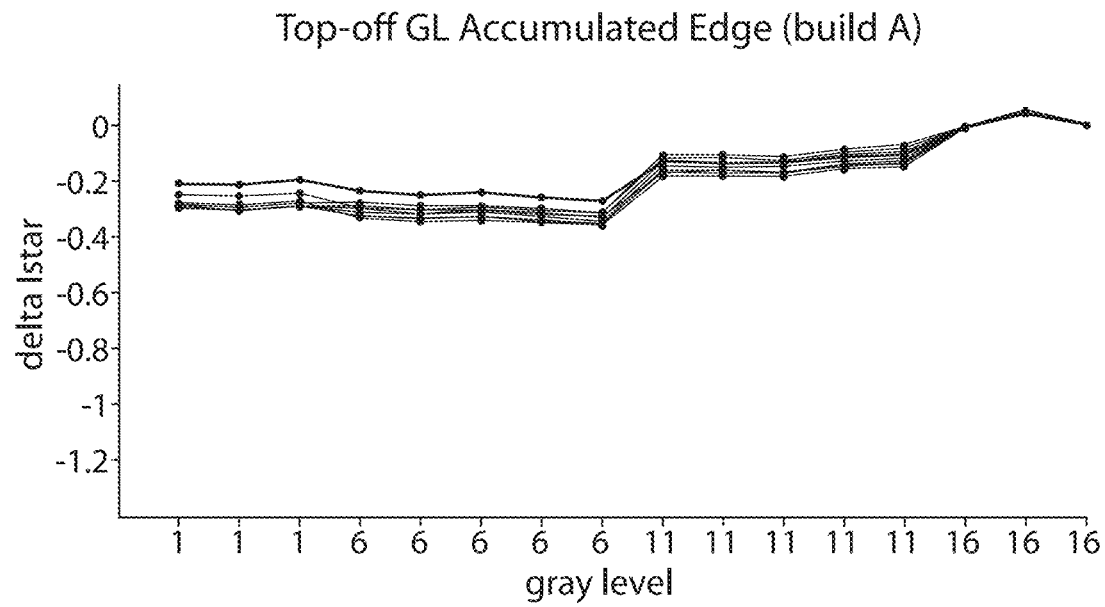
FIGS. 11A and 11B are graphs similar to those of FIGS. 10A and 10B respectively but showing the errors in gray levels achieved using a WWTOPDS method of the present invention in which the top-off pulses are applied without regard to DC imbalance.
Figure 11B:
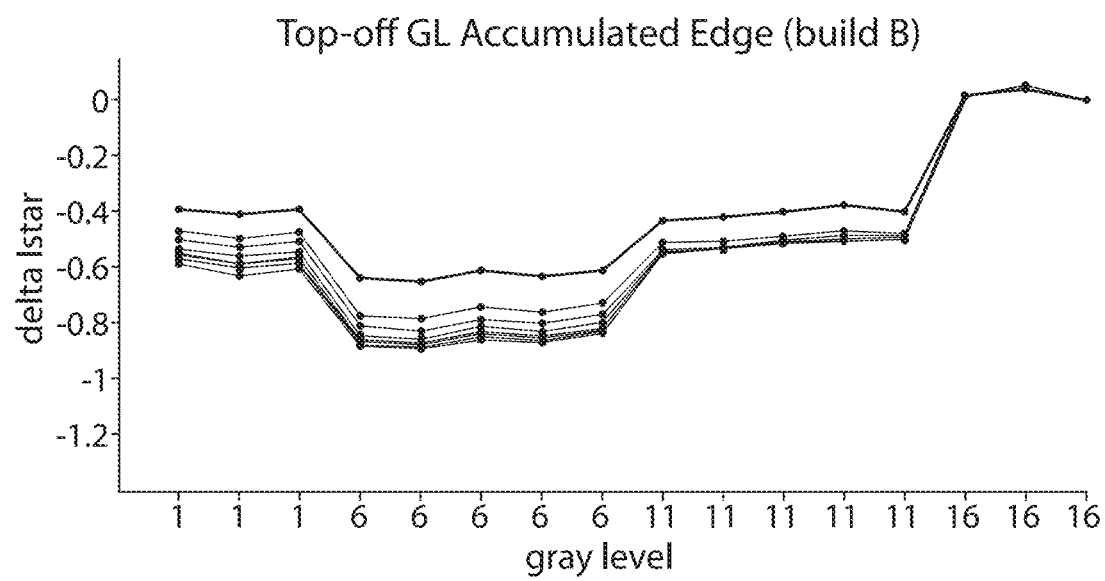

In another form of the WWTOPDS method of the present invention, the top-off pulses the top-off pulses are applied without regard to DC imbalance. This poses some risk of long-term damage to the display, but possibly such a small DC imbalance spread out over long time frames should not be significant, and in fact due to unequal storage capacitor charging on the TFT in the positive and negative voltage directions commercial displays already experience DC imbalance of the same order of magnitude. The results of one drive scheme of this type are shown in FIG. 11 of the accompanying drawings; these results may be compared with those in FIG. 6, although it should be noted that the vertical scale in different in the two set of graphs.

The WWTOPDS method of the present invention may be applied such that the top-off pulses are statistically DC balanced without the DC imbalance being mathematically bounded. For example, "payback" transitions could be applied to balance out "top-off" transitions in a manner that would be balanced on average for typical electro-optic media, but no tally of net impulse would tracked for individual pixels. It is been found that top-off pulses that are applied in a spatio-temporal context which reduces edge visibility are useful regardless of the exact mechanism by which they operate; in some cases it appears that edges are significantly erased, while in other cases it appears the center of a pixel is lightened to a degree that it compensates locally for the darkness of the edge artifact.

Top-off pulses can comprise one or more than one drive pulse, and may use a single drive voltage or a series of differing voltages in different drive pulses.

The WWTOPDS method of the present invention can provide a "flashless" drive scheme that does not require a periodic global complete update, which is considered objectionable by many users.

Part E: Straight Edge Extra Pixels Drive Scheme Method of the Invention

As already mentioned, the "straight edge extra pixels drive scheme" or "SEEPDS" method of the present invention seeks to reduce or eliminate edge artifacts which occur along a straight edge between driven and undriven pixels. The human eye is especially sensitive to linear edge artifacts, especially ones which extend along the rows or columns of a display. In the SEEPDS method, a number of pixels lying adjacent the straight edge between the driven and undriven areas are in fact driven, such that any edge effects caused by the transition do not lie only along the straight edge, but include edges perpendicular to this straight edge. It has been found that driving a limited number of extra pixels in this manner greatly reduces the visibility of edge artifacts.

Figure 12A:
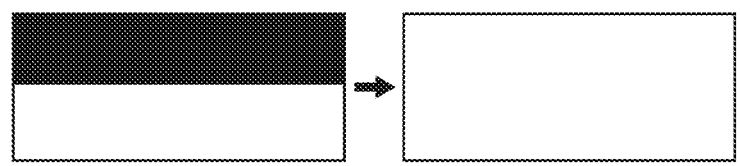
FIGS. 12A and 12B illustrates in a somewhat schematic manner the transitions occurring in a prior art drive method and in a SEEPDS drive scheme of the present invention effecting the same overall change in a display
Figure 12B:
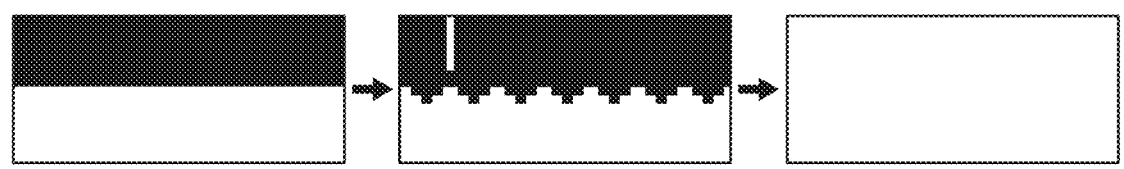

The basic principle of the SEEPDS method is illustrated in FIGS. 12A and 12B of the accompanying drawings. FIG. 12A illustrates a prior art method in which a regional or partial update is used to transition from a first image in which the upper half is black and the lower half white to a second image which is all white. Because a regional or partial drive scheme is used for the update, and only the black upper half of the first image is rewritten, it is highly likely that an edge artifact will result along the boundary between the original black and white areas. Such a lengthy horizontal edge artifact tends to be easily visible to an observer of the display and to be objectionable. In accordance with the SEEPDS method, as illustrated in FIG. 12B, the update is split into two separate steps. The first step of the update turns certain white pixels on the notionally "undriven" side (i.e., the side on which the pixels are of the same color, namely white, in both the initial and final images) of the original black/white boundary black; the white pixels thus driven black are disposed within a series of substantially triangular areas adjacent the original boundary, such that the boundary between the black and white areas becomes serpentine and that the originally straight line border is provided with numerous segments extending perpendicular to the original boundary. The second step turns all black pixels, including the "extra" pixels driven black in the first step, white. Even if this second step leaves edge artifacts along the boundary between the white and black areas existing after the first step, these edge artifacts will be distributed along the serpentine boundary shown in FIG. 12B and will be far less visible to an observer than would similar artifacts extending along the straight boundary shown in FIG. 12A. The edge artifacts may, in some cases, be further reduced because some electro-optic media display less visible edge artifacts when they have only remained in one optical state for a short period of time, as have at least the majority of the black pixels adjacent the serpentine boundary established after the first step.

When choosing the pattern to be executed in the SEEPDS method, care should be taken to ensure that the frequency of the serpentine boundary shown in FIG. 12B is not too high. Too high a frequency, comparable to that of the pixel spacing, cause the edges perpendicular to the original boundary to have the appearance of being smeared out and darker, enhancing rather than reducing edge artifacts. In such a case, the frequency of the boundary should be reduced. However, too low a frequency can also render artifacts highly visible.

In the SEEPDS method, the update scheme may follow a pattern such as:
  regional→standard image [any amount of time]-regional (slightly expanded to capture the new edge)→image with modified edge-regional→next image or:
  partial→standard image [any amount of time]-partial-→image with modified edge-partial→next image Alternatively, if full updates are being used in a specific region, the pattern may be:
  full regional→standard image [any amount of time]-regional(slightly expanded to capture the new edge)→next image Provided there is no unacceptable interference with the electro-optic properties of the display, a display might make use of the SEEPDS method all the time, according to the following pattern:
  partial→standard image w modified edge [any amount of time]-partial→next image In order to reduce edge artifacts over multiple updates, the SEEPDS method could be arranged to vary the locations of the curves of the serpentine boundary such as that shown in FIG. 12B in order to reduce repeated edge growth on repeated updates.

The SEEPDS method can substantially reduce visible edge artifacts in displays that make use of regional and/or partial updates. The method does not require changes in the overall drive scheme used and some forms of the SEEPDS method can be implemented without requiring changes to the display controller. The method can be implemented via either hardware or software.

Part F: Impulse Bank Drive Scheme Method of the Invention

As already mentioned, in the impulse bank drive scheme (IBDS) method of the present invention, pixels are "allowed" to borrow or return impulse units from a "bank" that keeps track of impulse "debt". In general, a pixel will borrow impulse (either positive or negative) from the bank when it is needed to achieve some goal, and return impulse when it is possible to reach the next desired optical state using a smaller impulse than that required for a completely DC balanced drive scheme. In practice, the impulse-returning waveforms could include zero net-impulse tuning elements such as balanced pulse pairs and period of zero voltage to achieve the desired optical state with a reduced impulse.

Obviously, and IBDS method requires that the display maintain an "impulse bank register" containing one value for each pixel of the display. When it is necessary for a pixel to deviate from a normal DC balanced drive scheme, the impulse bank register for the relevant pixel is adjusted to denote the deviation. When the register value for any pixel is non-zero (i.e., when the pixel has departed from the normal DC balanced drive scheme) at least one subsequent transition of the pixel is conducted using a reduced impulse waveform which differs from the corresponding waveform of the normal DC balanced drive scheme and which reduces the absolute value of the register value. The maximum amount of impulse which any one pixel can borrow should be limited to a predetermined value, since excessive DC imbalance is likely to have adverse effects on the performance of the pixel. Application-specific methods should be developed to deal with situations where the predetermined impulse limit is reached.

A simple form of an IBDS method is shown in FIG. 9 of the accompanying drawings. This method uses a commercial electrophoretic display controller which is designed to control a 16 gray level display. To implement the IBDS method, the 16 controller states that are normally assigned to the 16 gray levels are reassigned to 4 gray levels and 4 levels of impulse debt. It will be appreciated that a commercial implementation of an IBDS controller would allow for additional storage to enable the full number of gray levels to be used with a number of levels of impulse debt; cf. Part H below.

In the TBDS method illustrated in FIG. 9, a single unit (−15V drive pulse) of impulse is borrowed to perform a top-off pulse during the white-to-white transition under predetermined conditions (which being a zero transition should normally have zero net impulse). The impulse is repaid by making a black-to-white transition which lacks one drive pulse towards white. In the absence of any corrective action, the omission of the one drive pulse tends to make the resultant white state slightly darker that a white state using the full number of drive pulses. However, there are several known "tuning" methods, such as a pre-pulse balanced pulse pair or an intermediate period of zero voltage, which can achieve a satisfactory white state.

If the maximum impulse borrowing (3 units) is reached, a clearing transition is applied that is 3 impulse units short of a full white-to-white slideshow transition; the waveform used for this transition must of course be tuned to remove the visual effects of the impulse shortfall. Such a clearing transition is undesirable because of its greater visibility and it is therefore important to design the rules for the TBDS to be conservative in impulse borrowing and quick in impulse pay back.

Other forms of the TBDS method could make use of additional transitions for impulse payback thereby reducing the number of times a forced clearing transition is required. Still other forms of the TBDS method could make use of an impulse bank in which the impulse deficits or surpluses decay with time so that DC balance is only maintained over a short time scale; there is some empirical evidence that at least some types of electro-optic media only require such short term DC balance. Obviously, causing the impulse deficits or surpluses to decay with time reduces the number of occasions on which the impulse limit is reached and hence the number of occasions on which a clearing transition is needed.

The TBDS method of the present invention can reduce or eliminate several practical problems in bistable displays, such as edge ghosting in non-flashy drive schemes, and provides subject-dependent adaption of drive schemes down to the individual pixel level while still maintaining a bound on DC imbalance.

Part G: Mode Update Request Override Drive Scheme Method of the Invention

Figure 14:
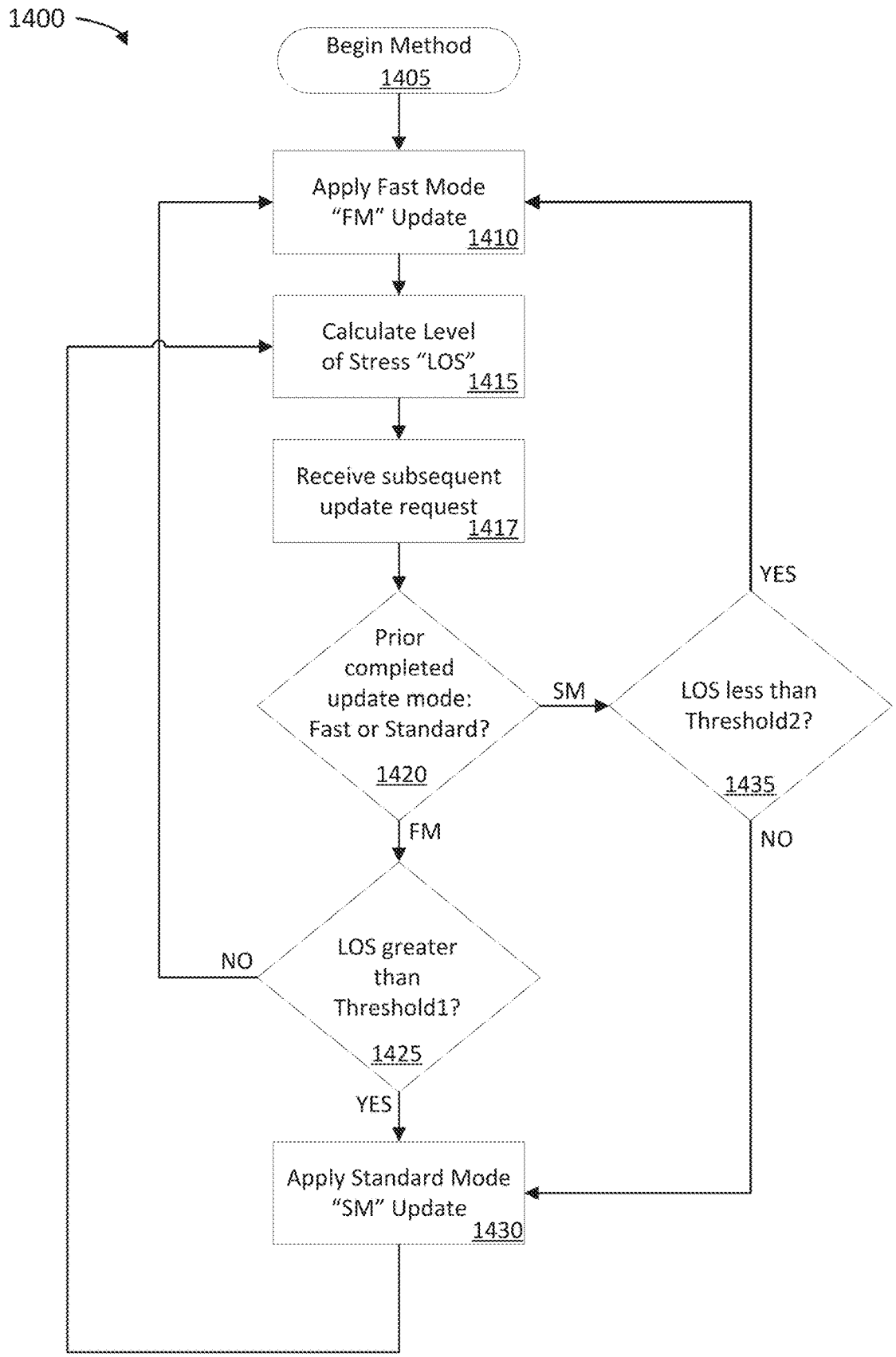
FIG. 14 shows a flowchart of an exemplary driving method incorporating a remnant voltage management state machine algorithm.

As discussed above, the mode update request override drive scheme (MURODS) method employs a state-machine algorithm that computes a numeric quantity indicative of the level of stress experienced by a display device, and switches between update schemes as needed to manage the build-up of remnant voltage. FIG. 14 shows a flowchart of an exemplary driving method 1400 incorporating a remnant voltage management state machine algorithm.

The method 1400 begins at step 1405 when an update to the display has been requested, and the display controller used to control the method 1400 selects driving waveforms to apply to the display pixels.

There are numerous events that can trigger an update request. For example, the update request can be triggered by a user interaction with the display such as swiping the screen to advance a page or scroll the screen. As another example, if the display device is presenting an animation, each successively displayed image causes an update request.

At step 1410, a fast mode update scheme is used to apply driving waveforms to the display pixels. A fast mode update scheme is one that prioritizes update time over color accuracy. For example, update times on a display device including a full color electronic ink system with four color pigments can be condensed to about 500-650 ms using a fast mode update scheme in conjunction with interrupting the PDD routine after every update and providing no, or substantially no, dwell time after each update. This makes the fast mode update scheme well-suited for handling the use case in which the user frequently interacts with the display device. However, the fast mode update scheme typically includes DC-imbalanced driving waveforms which can lead to a build-up of remnant voltage and cause display artifacts such as ghosting.

At step 1415, a numeric quantity indicative of the level of stress experienced by the display device is computed. For example, the display controller used to control the method 1400 can calculate the level of stress quantity based on several variables and parameters of the system that are tracked for each update. For each update n, the level of stress or "LOS" quantity x(n) is computed. An exemplary equation for computing x(n) is illustrated here:

$$x(n) = e^{-\frac{UT(n)+DT(n)}{TAU}} * x(n-1) + e^{-\frac{DT(n)}{TAU}} * B$$

In some embodiments, x(n) is an approximation of the remnant voltage that is expected to have accumulated on a display pixel of the electro-optic display based on update n and all prior updates. In some embodiments, x(n) is a number that is a fraction of the remnant voltage or an order of magnitude greater than the remnant voltage. In some embodiments, x(n) is a scalar quantity that can be used as an index or indicator of the growth or decay of remnant voltage, but is not an approximation of the actual remnant voltage that is expected to have accumulated based on update n and all prior updates.

In the first term of the LOS quantity equation, UT(n) denotes the update time of the update mode that was used for the most recently-finished update in milliseconds, and DT(n) denotes how many milliseconds of PDD were applied after the most recently-finished update.

TAU represents the time constant of the decay of the level of stress quantity x(n). TAU is determined before updates begin being applied to the display, and remains static throughout all updates. In some embodiments, TAU corresponds directly to the RC time constant for the decay of remnant voltage on a particular display system or production batch of electrophoretic material. For example, a live display system can be characterized by measuring the amount of remnant voltage generated by a number of different update sequences, as well as the decay times for the remnant voltage. A value for TAU can then be calculated based on the curve resulting from the remnant voltage measurements over time.

In some embodiments, the ink system can be represented as a parameterized mathematical model and TAU can be approximated based on one or more simulations of the updates and measurements described above. In some embodiments, TAU is not specific to a particular display system or production batch of electrophoretic material. For example, the time constant of the decay of the level of stress quantity x(n) can be calculated based on several different display systems and/or production batches of electrophoretic material, and a value can be chosen for TAU that generally approximates the time constant of the decay of level of stress quantity x(n) across several ink platforms and display systems.

Finally, x(n−1) is the level of stress quantity calculated after completion of update n−1. One of skill in the art will appreciate that some initial conditions are set such that x(n) can be calculated after the first update.

Turning to the second term of the LOS quantity equation, DT(n) and TAU denote the same quantities as in the first term, and B is a quantity that changes depending on the driving mode that was used for update n. For example, if a fast mode update was used for update n, B can be a non-zero positive value or quantity that increases the value of x(n) since a fast more update is likely to increase remnant voltage. Alternatively, if a standard mode update was used for update n, B is set to zero, and the second term becomes zero.

The non-zero value of B used after a fast mode update does not change throughout all updates, and the value of B is always set to zero after a standard mode update. In some embodiments, if a fast mode update was used for update n, the value of B used is a factor representative of the worst case remnant voltage growth based on evaluations of update sequences that are the most DC imbalanced and cause the most remnant voltage growth. In some embodiments, if a fast mode update was used for update n, the value of B used is a factor representative of an average amount of remnant voltage growth based on evaluations of update sequences that are the most DC imbalanced and cause the most remnant voltage growth.

It can be understood from the level of stress quantity equation that increasing the update time UT(n) has the effect of reducing the growth of x(n) after each update. Likewise, increasing the post drive discharge time DT(n) has the effect of reducing the growth of x(n) after each update. Conversely, it can be understood that updating in fast mode and interrupting every PDD routine has the effect of increasing the growth of x(n) after each update.

Once x(n) has been calculated, the method 1400 proceeds to step 1417 which includes receiving a subsequent update request. For example, one or more events described above in connection with step 1405 can cause a subsequent request to update the optical state of a display pixel of the electro-optic display to be received.

Next, the method 1400 proceeds to step 1420 which determines whether update n was a fast mode update or a standard mode update. If update n was a fast mode update, the method 1400 proceeds to step 1425 where it is determined whether x(n) is greater than a first threshold. If update n was a standard mode update, the method 1400 proceeds to step 1435 where it is determined whether x(n) is less than a second threshold.

The first threshold is indicative of the limit of the display device's tolerable level of stress. As shown in step 1425, if x(n) has not exceeded the first threshold, the algorithm returns to step 1410 and another fast mode update is applied. However, if x(n) has exceeded the first threshold, the algorithm overrides the next requested fast mode update and instead proceeds to step 1430 where a standard mode update is used that is less stressful to the display.

A standard mode update scheme is one that gives similar priority to both update time and color accuracy. For example, update times on a display device including a full color electronic ink system with four color pigments can be 1000 ms in duration using a standard mode update scheme in conjunction with interrupting the PDD routine after every update and providing no, or substantially no, dwell time after each update. However, the waveforms used for a standard mode update are DC balanced, and have been observed to reduce the amount of remnant voltage even in cases where the PDD routine is immediately interrupted. This makes the standard mode update scheme well-suited for reducing the level of stress on the display device while only somewhat impacting the user experience, as updates can take 350-500 ms longer in standard mode. In some embodiments, the driving waveforms of the standard mode update scheme are between approximately 30% and 55% longer in duration than the driving waveforms of the fast update scheme. In some embodiments, the driving waveforms of the standard mode update scheme are between approximately 50% and 70% longer in duration than the driving waveforms of the fast update scheme.

Once the algorithm has overridden fast mode updates and update n is a standard mode update, the method 1400 proceeds from step 1420 to step 1435 where it is determined whether x(n) is less than a second threshold.

This second lower threshold is incorporated into the algorithm to allow for hysteresis so that the display can run in the less stressful mode only until the level of stress quantity computed and tracked by the algorithm is reduced to a level indicative of a tolerable level of stress experienced by the display device. The first and second thresholds can be set to enable the average level of stress due to remnant charge build-up to be reduced while also decreasing the frequency with which the display device switches between modes of operation under specific use cases.

As shown in step 1435, if x(n) is not yet less than the second threshold, the algorithm returns to step 1430 and another standard mode update is applied. However, if x(n) is less than the second threshold, the algorithm returns to step 1410 and once again applies fast mode updates.

Figure 15:
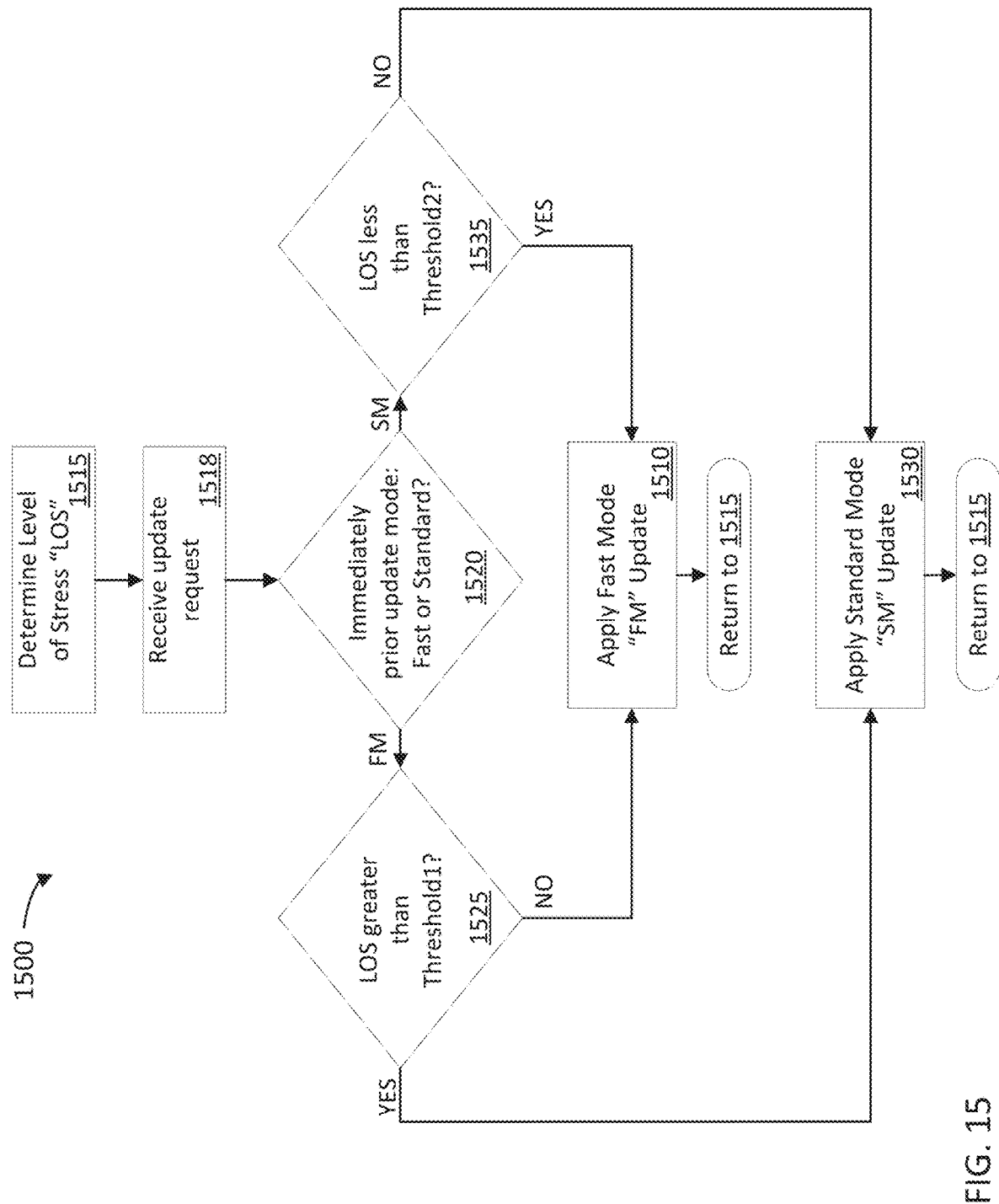
FIG. 15 shows a flowchart of an exemplary driving method incorporating a remnant voltage management state machine algorithm.

FIG. 15 shows a flowchart of another exemplary driving method 1500 incorporating a remnant voltage management state machine algorithm. The operations underlying the steps of the method 1500 are substantially similar to the steps of methods 1400. Accordingly, the steps of the method 1500 have been numbered consistently with like steps of the methods 1400 wherever possible.

Method 1500 begins by determining (1505) a level of stress quantity for a display pixel of the electro-optic display based on at least one prior update to the optical state of the display pixel. For example, an algorithm using the exemplary equation described in connection with step 1415 of the method 1400 can be used to calculate the level of stress quantity based on prior updates (e.g., n, n−1). As discussed above, initial conditions can be set such that x(n) can be calculated when there have not been any prior updates to the optical state of the display pixel, such that x(n) is undefined and/or cannot be determined.

Method 1500 then includes receiving (1518) a request to update the optical state of the display pixel. For example, one or more events described above in connection with step 1405 of the method 1400 can cause a request to update the optical state of a display pixel of the electro-optic display to be received.

Next, at step 1520, method 1500 determines whether the driving waveforms that were used for an immediately prior update of the display pixel were from a first update scheme (e.g., a fast mode update scheme) or a second update scheme (e.g., a standard mode update scheme). If the driving waveforms used to for the immediately prior update were from the first update scheme, the method 1500 proceeds to step 1525 where it is determined whether the level of stress quantity x(n) is greater than a first level of stress threshold. If the driving waveforms used to for the immediately prior update were from the second update scheme, the method 1500 proceeds to step 1535 where it is determined whether the level of stress quantity x(n) is less than a second level of stress threshold.

Proceeding from step 1520 to step 1525, method 1500 includes applying driving waveforms from the first update scheme to the display pixel when driving waveforms from the first update scheme were used for an immediately prior update of the display pixel, and the level of stress quantity is not greater than a first level of stress threshold. Alternatively, method 1500 includes applying driving waveforms from the second update scheme to the display pixel when driving waveforms from the first update scheme were used for the immediately prior update of the display pixel, and the level of stress quantity is greater than the first level of stress threshold.

For example, similar to step 1425 of method 1400, if the level of stress quantity has not exceeded the first level of stress threshold, the algorithm proceeds to step 1510 and driving waveform from the first update scheme (e.g., fast mode update) are applied to the display pixel. However, if the level of stress quantity has exceeded the first level of stress threshold, the algorithm overrides the next requested fast mode update and instead proceeds to step 1530 where driving waveforms from a second update scheme (e.g., standard mode update) that are less stressful to the display are applied. After updating the optical state of the display pixel by applying driving waveforms from the first update scheme (1510) or the second update scheme (1530), the method 1500 returns to step 1515 where the level of stress quantity is determined based on the update that just completed in preparation for any subsequent update requests (e.g., step 1518).

In the case where driving waveforms from the second update scheme were used for the immediately prior update of the display pixel, method 1500 proceeds from step 1520 to step 1535 where it is determined whether the level of stress quantity is less than a second level of stress threshold. Proceeding from step 1520 to step 1535, method 1500 includes applying driving waveforms from the first update scheme to the display pixel when driving waveforms from the second update scheme were used for the immediately prior update of the display pixel, and the level of stress quantity is less than a second level of stress threshold. Alternatively, method 1500 includes applying driving waveforms from the second update scheme to the display pixel when driving waveforms from the second update scheme were used for the immediately prior update of the display pixel, and the level of stress quantity is not less than the second level of stress threshold.

For example, similar to step 1435 of method 1400, if the level of stress quantity is not yet less than the second level of stress threshold, the algorithm proceeds to step 1530 and driving waveforms from a second update scheme (e.g., standard mode update) are applied to the display pixel. However, if the level of stress quantity is less than the second level of stress threshold, the algorithm proceeds to step 1510 where driving waveforms from the first update scheme (e.g., fast mode update) are applied to the display pixel. After updating the optical state of the display pixel by applying driving waveforms from the first update scheme (1510) or the second update scheme (1530), the method 1500 returns to step 1515 where the level of stress quantity is determined based on the update that just completed in preparation for any subsequent update requests (e.g., step 1518).

The overall application of the methods described above employing the stress management state machine enables the device to remain responsive to the user under constant use. The application of longer display updates may be less desirable to the user, but this is preferred to having a device that locks up and is unresponsive for a period of time (even if the device provides notification to the user, such as a "Please wait, I'm relaxing . . . " pop-up window).

Applying longer and/or DC-balanced updates in this alternate state also has the advantage of accelerating the remnant voltage reduction, and helps to lower the stress induced on the display.

Application of DC-imbalanced drive schemes have several advantages (enhanced performance, etc.), but display remnant voltage control becomes more important. The state-machine approach described above allows for implementation of these classes of drive-schemes in a device with a way to monitor and manage stress on the display while maintaining device's responsiveness to the user Part H: Display Controllers As will readily be apparent from the foregoing description, many of the methods of the present invention require or render desirable modifications in prior art display controllers. For example, the form of GCMDS method described in Part B above in which an intermediate image is flashed on the display between two desired images (this variant being hereinafter referred to as the "intermediate image GCMDS" or "II-GCMDS" method) may require that pixels undergoing the same overall transition (i.e., having the same initial and final gray levels) experience two or more differing waveforms depending upon the gray level of the pixel in the intermediate image. For example, in the II-GCMDS method illustrated in FIG. 5, pixels which are white in both the initial and final images will experience two different waveforms depending upon whether they are white in the first intermediate image and black in the second intermediate image, or black in the first intermediate image and white in the second intermediate image, Accordingly, the display controller used to control such a method must normally map each pixel to one of the available transitions according to the image map associated with the transition image(s). Obviously, more than two transitions may be associated with the same initial and final states. For example, in the II-GCMDS method illustrated in FIG. 4, pixels may be black in both intermediate images, white in both intermediate images, or black in one intermediate image and white in the others, so that a white-to-white transition between the initial and final images may be associated with four differing waveforms.

Various modifications of the display controller can be used to allow for the storage of transition information. For example, the image data table which normally stores the gray levels of each pixel in the final image may be modified to store one or more additional bits designating the class to which each pixel belongs. For example, an image data table which previously stored four bits for each pixel to indicate which of 16 gray levels the pixel assumes in the final image might be modified to store five bits for each pixel, with the most significant bit for each pixel defining which of two states (black or white) the pixel assumes in a monochrome intermediate image. Obviously, more than one additional bit may need to be stored for each pixel if the intermediate image is not monochrome, or if more than one intermediate image is used.

Alternatively, the different image transitions can be encoded into different waveform modes based upon a transition state map. For example, waveform Mode A would take a pixel through a transition that had a white state in the intermediate image, while waveform Mode B would take a pixel through a transition that had a black state in the intermediate image.

It is obvious desirable that both waveform modes begin updates simultaneously, so that the intermediate image appear smoothly, and for this purpose a change to the structure of the display controller will be necessary. The host processor (i.e., the device which provides the image to the display controller) must indicate to the display controller that pixels loaded into the image buffer are associated with either waveform Mode A or B. This capability does not exist in prior art controllers. A reasonable approximation, however, is to utilize the regional update feature of current controllers (i.e., the feature which allows the controller to use different drive schemes in differing areas of the display) and to start the two modes offset by one scan frame. To allow the intermediate image to appear properly, waveform Modes A and B must be constructed with this single scan frame offset in mind. Additionally the host processor will be required to load two images into the image buffer and command two regional updates. Image 1 loaded into the image buffer must be a composite of initial and final images where only the pixels subject to waveform Mode A region are changed. Once the composite image is loaded the host must command the controller to begin a regional update using waveform Mode A. The next step is to load Image 2 into the image buffer and command a global update using waveform Mode B. Since pixels commanded with the first regional update command are already locked into an update, only the pixels in the dark region of the intermediate image assigned to waveform Mode B will see the global update. With today's controller architectures only a controller with a pipeline-per-pixel architecture and/or no restrictions on rectangular region sizes would be able to accomplish the foregoing procedure.

Since each individual transition in waveform Mode A and waveform Mode B is the same, but simply delayed by the length of their respective first pulse, the same outcome may be achieved using a single waveform. Here the second update (global update in previous paragraph) is delayed by the length of the first waveform pulse. Then Image 2 is loaded into the image buffer and commanded with a global update using the same waveform. The same freedom with rectangular regions is necessary.

Other modifications of the display controller are required by the BPPWWTG method of the invention described in Part C above. As already described, the BPPWWTG method requires the application of balanced pulse pairs to certain pixels according to rules which take account of the transitions being undergone by neighbors of the pixel to which the balanced pulse pairs may be applied. To accomplish this at least two additional transitions are necessary (transitions that are not between gray levels), however current four-bit waveforms cannot accommodate additional states, and therefore a new approach is needed. Three options are discussed below.

The first option is to store at least one additional bit for each pixel, in the same manner as described above with reference to a GCMDS method. For such a system to work, the calculation of the next state information must be made on every pixel upstream of the display controller itself. The host processor must evaluate initial and final image states for every pixel, plus those of its nearest neighbors to determine the proper waveform for the pixel. Algorithms for such a method have been proposed above.

The second option for implementing the BPPWWTG method is again similar to that for implementing the GCMDS method, namely encoding the additional pixel states (over and above the normal 16 states denoting gray levels) into two separate waveform modes. An example would be a waveform Mode A, which is a conventional 16-state waveform that encodes transitions between optical gray levels, and a waveform Mode B, which is a new waveform mode that encodes 2 states (state 16 and 17) and the transitions between them and state 15. However, this does raise the potential problem that the impulse potential of the special states in Mode B will not be the same as in Mode A. One solution would be to have as many modes as there are white-to-white transitions and use only that transition in each mode, so producing Modes A, B and C, but this is very inefficient. Alternatively, one could send down a null waveform that maps the pixels making a Mode B to Mode A transition to state 16 first, and then transitioning from state 16 in a subsequent Mode A transition.

In order to implement a dual mode waveform system such as this, measures similar to the Dual Waveform Implementation Option 3 can be considered. Firstly, the controller must determine how to alter the next state of every pixel through a pixel-wise examination of the initial and final image states of the pixel, plus those of its nearest neighbors. For pixels whose transition falls under waveform Mode A, the new state of those pixels must be loaded into the image buffer and a regional update for those pixels must then be commanded to use waveform Mode A. One frame later, the pixels whose transition falls under waveform Mode B, the new state of those pixels must be loaded into the image buffer and a regional update for those pixels must then be commanded to use waveform Mode B. With today's controller architectures only a controller with a pipeline-per-pixel architecture and/or no restrictions on rectangular region sizes would be able to accomplish the foregoing procedure.

A third option is to use a new controller architecture having separate final and initial image buffers (which are loaded alternately with successive images) with an additional memory space for optional state information. These feed a pipelined operator that can perform a variety of operations on every pixel while considering each pixel's nearest neighbors' initial, final and additional states, and the impact on the pixel under consideration. The operator calculates the waveform table index for each pixel and stores this in a separate memory location, and optionally alters the saved state information for the pixel. Alternatively, a memory format may be used whereby all of the memory buffers are joined into a single large word for each pixel. This provides a reduction in the number of reads from different memory locations for every pixel. Additionally a 32-bit word is proposed with a frame count timestamp field to allow arbitrary entrance into the waveform lookup table for any pixel (per-pixel-pipelining). Finally a pipelined structure for the operator is proposed in which three image rows are loaded into fast access registers to allow efficient shifting of data to the operator structure.

The frame count timestamp and mode fields can be used to create a unique designator into a Mode's lookup table to provide the illusion of a per-pixel pipeline. These two fields allow each pixel to be assigned to one of 15 waveform modes (allowing one mode state to indicate no action on the selected pixel) and one of 8196 frames (currently well beyond the number of frames needed to update the display). The price of this added flexibility achieved by expanding the waveform index from 16-bits, as in prior art controller designs, to 32-bits, is display scan speed. In a 32-bit system twice as many bits for every pixel must be read from memory, and controllers have a limited memory bandwidth (rate at which data can be read from memory). This limits the rate at which a panel can be scanned, since the entire waveform table index (now comprised of 32-bit words for each pixel) must be read for each and every scan frame.

The operator may be a general purpose Arithmetic Logic Unit (ALU) capable of simple operations on the pixel under examination and its nearest neighbors, such as:

Bitwise logic operations (AND, NOT, OR, XOR);
Integer arithmetic operations (addition, subtraction, and optionally multiplication and division); and
Bit-shifting operations Nearest neighbor pixels are identified in the dashed box surrounding the pixel under examination. The instructions for the ALU might be hard-coded or stored in system non-volatile memory and loaded into an ALU instruction cache upon startup. This architecture would allow tremendous flexibility in designing new waveforms and algorithms for image processing.

Consideration will now be given to the image pre-processing required by the various methods of the present invention. For a dual mode waveform, or a waveform using balanced pulse pairs, it may be necessary to map n-bit images to n+1-bit states. Several approaches to this operation may be used:

(a) Alpha blending may allow dual transitions based upon a transition map/mask. If a one-bit per pixel alpha mask is maintained that identifies the regions associated with transition Mode A, and transition Mode B, this map may be blended with the n-bit next image to create an n+1-bit transition mapped image that can then use an n+1-bit waveform. A suitable algorithm is:

$$DP = \alpha IP + (1 - \alpha)M$$

{(if M=0, DP=0.5IP, Designating shift right 1-bit for IP data
if M=1, DP=IP, Designating no shift of data)}
Where DP=Display Pixel
IP=Image Pixel
M=Pixel Mask (either 1 or 0)
$\alpha$=0.5

For the 5-bit example with 4-bit gray level image pixels discussed above, this algorithm would place pixels located within the transition Mode A region (designated by a 0 in the pixel Mask) into the 16-31 range, and pixels located in the transition Mode B region into the 0-15 range.

(b) Simple raster operations may prove to be easier to implement. Simply ORing the mask bit into the most significant bit of the image data would accomplish the same ends.

(c) Additionally adding 16 to the image pixels associated with one of the transition regions according to a transition map/mask would also solve the problem.

For waveforms using balanced pulse pairs, the above steps may be necessary but are not sufficient. Where dual mode waveforms have a fixed mask, BPP's require some non-trivial computation to generate a unique mask necessary for a proper transition. This computation step may render a separate masking step needless, where image analysis and display pixel computation can subsume the masking step.

Figure 13:
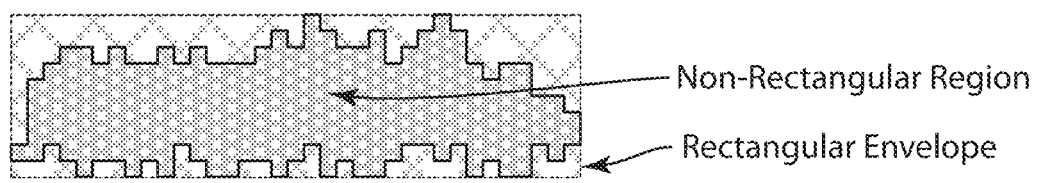
FIG. 13 illustrates schematically the controller architecture required for a SEEPDS that allows regions of arbitrary shape and size to be updated, as compared with prior art controllers which only allow selection of rectangular areas.

The SEEPDS method discussed in Part E above involves an additional complication in controller architecture, namely the creation of "artificial" edges, i.e., edges which do not appear in the initial or final images but are required to define intermediate images occurring during the transition, such as that shown in FIG. 12B. Prior art controller architecture only allows regional updates to be performed within a single continuous rectangular boundary, whereas the SEEPDS method (and possibly other driving methods) require a controller architecture that allows multiple discontinuous regions of arbitrary shape and size to be updated concurrently, as illustrated in FIG. 13.

A memory and controller architecture which meets this requirement reserves a (region) bit in image buffer memory to designate any pixel for inclusion in a region. The region bit is used as a "gatekeeper" for modification of the update buffer and assignment of a lookup table number. The region bit may in fact comprise multiple bits which can be used to indicate separate, concurrently updateable, arbitrarily shaped regions that can be assigned different waveform modes, thus allowing arbitrary regions to be selected without creation of a new waveform mode.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of display pixels, the method comprising:
determining a level of stress quantity for a display pixel of the electro-optic display based on at least one prior update to the optical state of the display pixel;
receiving a request to update the optical state of the display pixel;
applying driving waveforms from a first update scheme to the display pixel when:
(i) driving waveforms from the first update scheme were used for an immediately prior update of the display pixel, and the level of stress quantity is not greater than a first level of stress threshold; or
(ii) driving waveforms from a second update scheme were used for the immediately prior update of the display pixel, and the level of stress quantity is less than a second level of stress threshold; and
applying driving waveforms from the second update scheme to the display pixel when:
(i) driving waveforms from the first update scheme were used for the immediately prior update of the display pixel, and the level of stress quantity is greater than the first level of stress threshold; or
(ii) driving waveforms from the second update scheme were used for the immediately prior update of the display pixel, and the level of stress quantity is not less than the second level of stress threshold, wherein the second update scheme comprises driving waveforms that are longer in duration than the driving waveforms of the first update scheme.

2. The method of claim 1 wherein the request to update the optical state of the display pixel of the electro-optic display is triggered by a user interaction with the electro-optic display.

3. The method of claim 2 wherein the user interaction comprises swiping a surface of a screen of the electro-optic display.

4. The method of claim 2 wherein the user interaction comprises presenting an animation on the electro-optic display.

5. The method of claim 1 wherein the first update scheme comprises driving waveforms that are DC-imbalanced.

6. The method of claim 1 wherein the second update scheme comprises driving waveforms that are DC-balanced.

7. The method of claim 1 wherein the driving waveforms of the second update scheme are between approximately 350 ms and 500 ms longer in duration than the driving waveforms of the first update scheme.

8. The method of claim 1 wherein the driving waveforms of the second update scheme are between approximately 30% and 55% longer in duration than the driving waveforms of the first update scheme.

9. The method of claim 1 wherein the driving waveforms of the second update scheme are between approximately 50% and 70% longer in duration than the driving waveforms of the first update scheme.

10. The method of claim 1 wherein the level of stress quantity is a numeric quantity comprising an approximation of an actual amount of remnant voltage that has accumulated on the display pixel.

11. The method of claim 1 wherein the level of stress quantity is a scalar quantity comprising an index indicating a growth or decay in an amount of remnant voltage that has accumulated on the display pixel.

12. The method of claim 1 wherein determining the level of stress quantity for the display pixel comprises computing the equation:

$$x(n) = e^{-\frac{UT(n)+DT(n)}{TAU}} * x(n-1) + e^{-\frac{DT(n)}{TAU}} * B,$$

wherein x(n) denotes the level of stress quantity for an update n, UT(n) denotes a duration in milliseconds of driving waveforms used for the immediately prior update of the display pixel, DT(n) denotes how many milliseconds of a post drive discharge routine were applied after the immediately prior update of the display pixel, TAU represents a time constant of a decay of the level of stress quantity x(n), x(n−1) is a level of stress quantity calculated based on the immediately prior update of the display pixel, and B has a numeric value that changes depending on the driving mode that was used for update n.

13. The method of claim 12 wherein B is set to a non-zero positive value after applying driving waveforms from the first update scheme to the display pixel.

14. The method of claim 12 wherein the value of B is set to zero after applying driving waveforms from the second update scheme to the display pixel.

15. The method of claim 1 further comprising interrupting a post drive discharge routine after applying driving waveforms from the first update scheme.

16. The method of claim 1 further comprising performing substantially no dwell time after applying driving waveforms from the first update scheme.

17. The method of claim 1 further comprising interrupting a post drive discharge routine after applying driving waveforms from the second update scheme.

18. The method of claim 1 further comprising performing substantially no dwell time after applying driving waveforms from the second update scheme.

19. The method of claim 1 wherein the first level of stress threshold indicates a limit of the electro-optic display's tolerable level of stress.

20. A method for driving an electro-optic display having a plurality of display pixels, the method comprising:
determining a level of stress quantity for a display pixel of the electro-optic display based on at least one prior update to the optical state of the display pixel;
receiving a request to update the optical state of the display pixel;
applying driving waveforms from a first update scheme to the display pixel when:
(i) driving waveforms from the first update scheme were used for an immediately prior update of the display pixel, and the level of stress quantity is not greater than a first level of stress threshold; or
(ii) driving waveforms from a second update scheme were used for the immediately prior update of the display pixel, and the level of stress quantity is less than a second level of stress threshold; and
applying driving waveforms from the second update scheme to the display pixel when:
(i) driving waveforms from the first update scheme were used for the immediately prior update of the display pixel, and the level of stress quantity is greater than the first level of stress threshold; or
(ii) driving waveforms from the second update scheme were used for the immediately prior update of the display pixel, and the level of stress quantity is not less than the second level of stress threshold,
wherein determining the level of stress quantity for the display pixel comprises computing the equation:

$$x(n) = e^{-\frac{UT(n)+DT(n)}{TAU}} * x(n-1) + e^{-\frac{DT(n)}{TAU}} * B,$$

wherein x(n) denotes the level of stress quantity for an update n, UT(n) denotes a duration in milliseconds of driving waveforms used for the immediately prior update of the display pixel, DT(n) denotes how many milliseconds of a post drive discharge routine were applied after the immediately prior update of the display pixel, TAU represents a time constant of a decay of the level of stress quantity x(n), x(n−1) is a level of stress quantity calculated based on the immediately prior update of the display pixel, and B has a numeric value that changes depending on the driving mode that was used for update n.

* * * * *